US007881862B2

(12) United States Patent
Pei et al.

(10) Patent No.: US 7,881,862 B2
(45) Date of Patent: Feb. 1, 2011

(54) INCIDENT COMMAND POST

(75) Inventors: Robert Pei, Richmond, CA (US); Tim Kaldewey, Mountain View, CA (US); Samir Raiyani, Sunnyvale, CA (US)

(73) Assignee: SAP AG, Walldorf (DE)

(*) Notice: Subject to any disclaimer, the term of this patent is extended or adjusted under 35 U.S.C. 154(b) by 1308 days.

(21) Appl. No.: 11/092,310

(22) Filed: Mar. 28, 2005

(65) Prior Publication Data

US 2006/0217881 A1 Sep. 28, 2006

(51) Int. Cl.
*G01C 21/32* (2006.01)

(52) U.S. Cl. ............. 701/208; 701/207; 701/213; 701/211; 340/995.14; 340/572.1; 340/511

(58) Field of Classification Search .......... 701/50, 701/207, 208, 213; 340/511, 572.1
See application file for complete search history.

(56) References Cited

U.S. PATENT DOCUMENTS

| 5,471,391 | A  | * | 11/1995 | Gudat et al. ............... 701/50 |
| 5,646,844 | A  | * | 7/1997  | Gudat et al. ............... 701/208 |
| 5,974,348 | A  | * | 10/1999 | Rocks ........................ 701/28 |
| 6,047,227 | A  | * | 4/2000  | Henderson et al. ........... 701/50 |
| 6,189,626 | B1 | * | 2/2001  | Hanseder .................... 172/4.5 |
| 6,282,477 | B1 | * | 8/2001  | Gudat et al. ................ 701/50 |
| 6,600,418 | B2 | * | 7/2003  | Francis et al. ............. 340/572.1 |
| 6,720,920 | B2 | * | 4/2004  | Breed et al. ................ 342/386 |
| 6,744,436 | B1 | * | 6/2004  | Chirieleison et al. ........ 345/427 |
| 6,847,892 | B2 | * | 1/2005  | Zhou et al. ................. 701/213 |
| 7,177,814 | B2 |   | 2/2007  | Gong et al. |
| 7,203,907 | B2 |   | 4/2007  | Weng et al. |
| 7,243,001 | B2 | * | 7/2007  | Janert et al. ............... 700/214 |
| 7,359,858 | B2 |   | 4/2008  | Gong et al. |
| 2002/0070862 | A1 | * | 6/2002 | Francis et al. ............ 340/572.1 |
| 2002/0174038 | A1 | * | 11/2002 | Chien ........................ 705/28 |
| 2002/0186144 | A1 | * | 12/2002 | Meunier .................. 340/825.28 |
| 2003/0062001 | A1 | * | 4/2003  | Andersson ................. 119/174 |
| 2003/0146932 | A1 |   | 8/2003  | Weng et al. |
| 2003/0149526 | A1 | * | 8/2003  | Zhou et al. ................. 701/213 |
| 2003/0149563 | A1 |   | 8/2003  | Gong et al. |
| 2003/0149564 | A1 |   | 8/2003  | Gong et al. |
| 2003/0208692 | A9 | * | 11/2003 | Kimmel et al. ............. 713/201 |
| 2003/0218638 | A1 |   | 11/2003 | Goose et al. ................ 297/330 |
| 2004/0006474 | A1 |   | 1/2004  | Gong et al. |
| 2004/0070515 | A1 | * | 4/2004  | Burkley et al. ............ 340/825.49 |

(Continued)

OTHER PUBLICATIONS

Doshi, R., et al. "Development of a Wireless Location system in Lindley Hall," pp. 1-28 (Jan. 2004).

(Continued)

*Primary Examiner*—Thomas G Black
*Assistant Examiner*—Wae Louie

(57) ABSTRACT

Provided are systems and methods for tracking resources at a site and initiating audio and video communication with tracked resources using multiple input and output modalities. The systems include a location tracking system, including a positioning engine and a presentation engine, an environmental tracking system, location and environmental sensors, either permanently installed or temporarily deployed, and portable devices such as mobile phones or personal digital assistants carried by the tracked resources and users. The methods include tracking such resources at a site, displaying their locations on a portable device using a visual map display, and providing the ability to initiate bi-directional audio and video communications with one of more of the tracked resources.

36 Claims, 14 Drawing Sheets

U.S. PATENT DOCUMENTS

2006/0217881 A1* 9/2006 Pei et al. .................... 701/208
2007/0129869 A1* 6/2007 Gudat et al. ................. 701/50
2008/0125965 A1* 5/2008 Carani et al. ............... 701/207
2008/0318591 A1* 12/2008 Oliver .................... 455/456.1

OTHER PUBLICATIONS

Hightower, J., et al. "The Location Stack," *Intel Research Technical Report*, Internet: URL://www.intelresearch.net/Publications/Seattle/0905200316404 152.pdf (Jul. 2003).

Priyantha, N., et al. "The Cricket Location-Support System", *6th ACM International Conference on Mobile Computing and Networking (ACM MOBICOM)* (Aug. 2000).

Park, S., et al. "Design of a Wearable Sensor Badge for Smart Kindergarten," *Proceedings of the 6th International Symposium on Wearable Computers (ISWC)* (Oct. 2002).

Savvides, A., et al. "Dynamic Fine-Grained Localization in Ad-Hoc Networks of Sensors" *MobiCom*, URL: http://nesl.ee.ucla/projects/ahlos/report (Jul. 2001).

Want, R., et al. "The Active Badge Location System," *ACM Transactions on Information Systems*, vol. 10, No. 1, pp. 91-102 (Jan. 1992).

Ward, A., et al. "A New Location Technique for the Active Office," *IEEE Personal Communications*, vol. 4, No. 5, pp. 42-47 (Oct. 1997).

* cited by examiner

INCIDENT COMMAND POST

CROSS-REFERENCE TO RELATED APPLICATIONS

This patent application is related to the following co-pending patent applications: (i) U.S. application Ser. No. 10/131,216, filed Apr. 25, 2002, titled "Multi-Modal Synchronization," (ii) U.S. application Ser. No. 10/157,030, filed May 30, 2002, titled "User interface for Data Access and Entry," (iii) U.S. application Ser. No. 10/184,069, filed Jun. 28, 2002, titled "User interface for Data Access and Entry," and (iv) U.S. application Ser. No. 10/305,267, filed Nov. 27, 2002, titled "Dynamic Grammar for Voice-Enabled Applications." All patents, patent applications and papers cited, including those above, are herein incorporated by reference in their entirety.

FIELD OF THE INVENTION

This invention pertains to methods and apparatus for information gathering and for communication among users at a physical site.

BACKGROUND OF THE INVENTION

In recent years, a plethora of devices such as mobile phones and walkie-talkie radios have been developed for bi-directional audio communication amongst a group of mobile users. In addition to audio devices, a number of video devices, such as web cameras and videophones have been developed in order to provide bi-directional video communication amongst a group of users.

In dynamic situations such as fire emergencies, it is vital for the coordinating personnel, who are stationed at an incident command post to track the location of firefighters and other personnel on the ground, in order to observe and direct them properly. They also require the means to initiate and maintain audio and video communication link with the relevant personnel.

In the current art, the incident command post typically establishes an audio or video link with the firefighters using separate, non-integrated, systems for audio and for video communication. For example, a walkie-talkie system is used for audio communication while a closed circuit television ("CCTV") camera is used for video communication. A computer processor may also be used to provide location information of personnel using devices that transmit such information.

Also, in the current art buildings are often equipped with various types of sensors, for example location sensors, temperature sensors, motion sensors and smoke sensors. Such sensors may or may not be connected to a computing network. Such sensors provide valuable information about location of users/resources and the information about the environment at a site location.

However, in the current art, these systems/devices (mobile phones, walkie-talkies, video phones, etc.) lack the integration necessary to communicate information for decision-making on one single interface. There is no single system that can provide centralized location and sensor information, as well as function as a communication hub. This lack of integration causes coordination and communication related problems in mission critical situations like a fire emergency.

There exists a need for systems and methods that allow natural and flexible communication/interaction in mission critical situations. There is a need to provide a bi-directional communication/interaction platform that integrates information from various location-based systems, audio- and video-streaming systems and sensor systems. Such a system would really provide, on a single interface, real time situation visibility through live video communication, and an easy and flexible interface for setting up bi-directional interaction and/or communication, and valuable sensor data.

In a dynamic environment, the ideal platform to provide such integration for the users are mobile devices such as laptops, cellular phones and personal digital assistants ("PDAs"). These devices are well-suited for the situation because:

they are compact and easy to use, their screens are capable of video display with a reasonable degree of resolution, they can be easily connected to a wireless network, thus aiding mobile usage, they provide the required bi-directional communication capabilities, and most importantly, they can be connected to a server system that integrates location information, real time video display and aids multi-modality.

The ideal interface for such a platform to provide integration of sensor information and audio and video communication—would be conveniently integrated and multimodal, allowing concurrent use of input modalities such as speech, keypad, stylus gestures, and output modalities such as audio, video and map display.

Users of such an interface could perform a variety of tasks, including tracking users/resources, navigating through their environment, locating other users/resources in their environment and issuing automated commands to geographically collected resources/users using multiple modalities. Users can also dynamically update the layout of the environment on the map display to accurately reflect the situation.

DEFINITIONS

Sensors:—As is well known in the art, sensors 170 are devices that gather data from the milieu around them. They typically convert this data into signals and transmit them to other devices such as computers (via a wired or wireless network). The signals are then interpreted to create corresponding information by computer processors. Some examples of types of data gathered by sensors 170 are location data (e.g., GPS coordinates), and environmental data (temperature, pressure, humidity, the presence of chemicals or smoke, etc.). For purposes of this document, it is useful to distinguish between location signals, versus environmental signals (which will mean everything but location).

Typically, location sensors and environmental sensors are physically distinct, in that sensors available in the current art can transmit location signals or environmental signals, but not both. Not surprisingly, for purposes of the current invention, a location sensor and an environmental sensor can be packaged together in the same device, so that in logical terms, a single device is transmitting both types of signals.

In one embodiment of this invention, location sensors associated with mobile users and objects (both stationary and mobile) transmits location signals enabling the tracking of users and objects respectively. The location sensor might be associated with the mobile multimodal system 120 carried by a user or might be stationary. A stationary location sensor might already be extant at a site (e.g., embedded in the walls and other features of a building), or might be introduced by users to help map the site (a large number of location sensors at various points in a building can be sufficient to add information to a map, or even create the map itself).

"Mobile computing framework"—A mobile computing framework 110 is a framework that, in one embodiment, includes a computing network, physically and logically distinct multimodal systems 120 (that are typically carried by users), and a location tracking system 140. In one embodiment the multimodal systems 120 are devices with audio, video and text modes of display and communication capabilities. Location signals are transmitted by location sensors 170 of the network to the location tracking system 140, which thus locates the tracked resources associated with the sensors.

The mobile computing framework 110 may also have an environmental tracking system 160 for interpreting signals from the environmental sensors, and an archiving system 150 for storing the environmental information, including maps of the site created by the mobile computing framework 110.

A "tracked resource" simply refers to a person or user, a piece of equipment or any other moving or non-moving object that has a location sensor, and thus can be tracked by a location tracking system 140. An example of a tracked resource is a movable fire extinguisher. Another example of a tracked resource is a non-movable closed-circuit TV camera installed inside a building. A tracked resource may be carried by a user of the system who will be tracked along with the resource that he or she is carrying. For example location sensors are associated with mobile multimodal systems 120 carried by persons or users and thereby helps in tracking location of users of such mobile multimodal systems 120. For the purpose of this document we will use the word user for persons in certain places instead of referring to them as tracked resources.

"Location tracking system"—A location tracking system 140 is a system for managing the location data of moving and non-moving resources. The location tracking system 140, in one embodiment includes a positioning engine 220 and a presentation system 230.

"Positioning engine"—A positioning engine 220 is a system for gathering location signals of moving and non-moving tracked resources. The positioning engine 220 works with location signals transmitted by location sensors. In one embodiment the positioning engine collects and aggregates the location signals from location sensors associated with mobile multimodal systems 120 carried by users. In another embodiment the positioning engine collects and aggregates location signals from location sensors that may be stationary and might already be extant at a site (e.g., embedded in the walls and other features of a building), or might be introduced by users to help map the site (a large number of sensors at various points in a building can be sufficient to add information to a map, or even create the map itself).

As per the objects, the positioning engine 220 includes a location receiver to receive indoor or outdoor location signals from the location sensors, and a component to process and interpret received location signals. In one embodiment, the positioning engine can have a client software or hardware component that facilitates tracking similar to the hardware or software embedded in location sensors associated with the tracked resource. For example, if the positioning engine is using a tracking protocol that uses radio frequency signals, the tracked resource may carry a radio frequency transmitter and receiver Examples of location sensors include IEEE 802.11b-based or radio frequency-based products from companies such as Ekahau, Aeroscout and Wherenet that transmit their location signals to the positioning engine periodically.

"Presentation system"—In one embodiment, the objectives, of the presentation system 230 include, but are not limited to, communicating and presenting information to the mobile multimodal system 120. It also facilitates bidirectional audio and video communication between tracked resources (users) that use the mobile multimodal system 120 for such communication. The presentation system 230 includes (a) a component that receives requests from mobile multimodal system, and (b) a component to respond to the requests from the mobile multimodal system. The presentation system 230 manages all user interaction between the location tracking system 140 and the user.

The presentation system 230 facilitates bi-directional audio and video communication between the tracked resources through the collaboration components of a server framework such as the SAP NetWeaver collaboration platform.

Examples of a presentation system 230 include a web application running in the SAP NetWeaver application environment and responding to user requests over a Hypertext Transfer Protocol ("HTTP") connection. The response is a multimodal document (a document that uses more than one mode for communication for example text and voice) using XHTML+Voice ("X+V") or speech application language tags ("SALT") standard. The mobile device has to be equipped to communicate to the presentation system 230 using the identical standard.

The location tracking system 140 can also include but is not limited to other components such as the fusion engine 260 and the map storage device 250.

"Fusion engine"—A fusion engine 260 is a software component that integrates input information from various components connected to it and aggregates this information for output to tracked resources through the location tracking system. In one embodiment, the different components connected to the fusion engine 260 are the positioning engine 220, the presentation system 230 the map storage device 250 and the environmental tracking system 160. The fusion engine receives as input environmental sensor information from the environmental tracking system 160, location information from the positioning engine 220 and bidirectional audio and video communication information from the presentation system 230. The fusion engine 260 integrates the input information from the various components connected to it, aggregates this information for output and communicates the integrated output information to the mobile multimodal system 120 via the presentation system 230. The fusion engine 260 also sends information collected to the archiving system 150.

The fusion engine 260, in one embodiment of the invention, is a software component to be run on the SAP NetWeaver or a similar platform.

"Map storage device"—A map storage device 250 is a software database of maps and images stored in various formats. The map storage device 250, in one embodiment, is bi-directionally connected to the presentation system 230 and positioning engine 220. It displays maps on the mobile multimodal system 120 via the presentation system 230.

The map storage device 250 can be any database from vendors such as Oracle, IBM, Microsoft or Myself. The database must be capable of storing image information, as well as large amounts of information regarding coordinates of various points/locations of interest on the map.

"Environmental tracking system"—An environmental tracking system 160 is a system for interpreting environmental signals. The environmental tracking system 160 includes a processor to interpret relayed environmental signals. The processor communicates the interpreted environmental signals to the mobile multimodal system 120 via the location tracking system 140. The environmental tracking system 160 is bi-directionally linked to the location tracking system 140.

Examples of environmental sensors 170 are temperature and humidity sensors installed in office buildings. They may already be connected to a computing network in a building and accessed by the network of the present invention, if compatible. A new generation of environmental sensors 170 is based on ad hoc networking technology, variously known as Intel Motes, Berkeley Motes and Smart Dust. These environmental sensors 170 can sense various environment parameters such as temperature. When multiple motes are within communication distance of each other, they can form computing networks by themselves and can exchange information amongst themselves, or with external systems.

In the case that the value for a particular environmental parameter falls outside a pre-defined value, an event may be ascertained. For example, if fire is defined by the environmental parameter of temperature being 120° F. or greater, then any such signal example received by the environmental tracking system 160 will indicate a fire. The environmental tracking system communicates the occurrence of the event and its location (the event location being ascertained from an associated location sensor) to users of mobile multimodal system 120 via the location tracking system 140.

"Archiving system"—An archiving system 150 is a system for recording all bi-directional communication amongst tracked resources (users of mobile multimodal system 120 that is used for communication), all movements of tracked resources and other data. In one embodiment, it is a large multimedia database that records all bi-directional communication and all movements of tracked resources. It has a processor that time stamps the information stored. The processor also retrieves, replays, classifies and analyzes the stored information. The archiving system 150 is connected to the location tracking system 140.

"Mobile device"—A mobile device is a tracked resource with computing capabilities and with a user interface. In one embodiment, it may be a laptop or a Personal Digital Assistant ("PDA") or a similar computing device with a multimodal user interface.

"Multimodal interface"—A multimodal user interface is a computer user interface that supports a combination of input modalities such as speech, or mechanical—keyboard and stylus gesture—as well as a combination of output modalities such as aural and visual. The multimodal interface is associated with the mobile multimodal system.

"Multimodal system"—A multimodal system 120 is a system for communication between a user of a mobile device and a mobile computing framework 110 using a variety of input and output modalities. In one embodiment, the mobile device or system includes, but is not limited to, (a) An audio input/output system consisting of a microphone, a speaker and an audio codec (b) Display output and keypad/stylus input (c) A video input/output system consisting of a camera and a video codec (d) A multimodal browser which includes a parser, interpreter, an embedded speech recognition engine for text to speech conversion and speech to text conversion and a synchronization element that synchronizes for a user both audio and video inputs and outputs (e) A video buffer that enables streaming of video information in both directions and (f) 802.11b wireless communication capability including the software drivers and the antenna necessary to transmit and receive signals over the network and (g) A software component to interpret transmitted signals or signals received over the network, to deliver output to a user and receive input from a user. In the present invention, multimodal systems 120 are typically carried by users, and thus are mobile multimodal systems 120.

"XHTML+Voice"—XHTML+Voice is a markup language that is a combination of extended hypertext markup language ("XHTML") and voice extended markup language ("VXML"). The XHTML+Voice document may consist of maps, voice dialogs, voice grammars or any other information. The XHTML+Voice documents are parsable, interpretable and renderable by a multimodal XHTML+Voice browser. XHTML+Voice also incorporates XML-Events technologies. In XML-Events, a verbal utterance, or a stylus gesture, or a keypad input, for example, are referred to as events. Such events are pre-defined. The events are handled in XHTML+Voice using pre-defined handlers that are implemented using from a variety of scripting techniques like Javascript. When a pre-defined event occurs (for example when a voice utterance is made), the Javascript code in the pre-defined handler is activated and the event is handled. In one instance of voice utterance, XML-Events use voice handlers implemented using Javascript for handling the pre-defined event.

The XHTML+Voice document is parsed by the browser (by the parser in the browser, that comprises a Javascript engine) and a document object model (DOM) of the document is created inside the browser on the client device. The DOM of the document also comprises the pre-defined events and event handlers as in the original XHTML+Voice document (from which the DOM is created). Hence, when a pre-defined event occurs the event handlers are invoked, the pre-defined event is handled and that may change the DOM. The changes made to the DOM are reflected in the visual display as well as in the voice dialog presented by the browser. The changes made to the DOM are communicated to the location tracking system as HTTP requests.

"Zone"—A zone, in the context of the mobile application framework, is an area or a region of the location site. The zone, in one embodiment, is demarcated on the graphical map. One or more tracked resources may be present in a zone at any given time.

"Command Post"—A Command Post is the central point for co-ordination and communication amongst a group of tracked resources. In one embodiment, it has at a minimum all of the elements of a tracked resource.

SUMMARY OF THE INVENTION

One aspect of the present invention provides a system for dynamically mapping a site for presentation to a user, the system including a computer network; a plurality of location sensors that can transmit location signals over the network; a network module for receiving the location signals; a location tracking system including a positioning engine and a presentation engine; and a user display. A similar system can include a computing means; a plurality of sensing means that can transmit location signals over the network; a network receiving means for receiving location signals; a location tracking means including a positioning means and a presentation means for displaying the map to the user; and a user display means.

The system also may be able to update the map by receiving and interpreting additional location signals. One of the location sensors may be associated with a tracked resource. The system may also include a personal digital assistant, laptop computer or a mobile phone that includes a user display. The system may be integrated with a multimodal system. The location sensors may be extant location sensors associated with the site or RFID location sensors placed at the site at the time of mapping. The system may include environmental sensors that transmit environmental signals, which can be interpreted as environmental information and presented in conjunction with the map. The system may also include a mobile computing framework, a location tracking system, an archiving system, a map storage device and an environmental tracking system.

Another aspect of the present invention provides a method for presenting localized environmental information superimposed on a map of a site, to a user, the method including: receiving location signals from a plurality of location sensors and environmental signals from a plurality of environmental sensors; interpreting the location signals as location information and the environmental signals as environmental information; applying he location information and the environmental information to a map of the site as localized environmental information; displaying and archiving the map with the applied information; repeating the previous on an ongoing basis so as to dynamically update the localized environmental information; and determining occurrence of an event when the environmental information indicates that an environmental parameter falls outside of a predetermined range.

The location sensors of the invention may be associated with tracked resources. The displaying may be carried out on a personal digital assistant, laptop computer or a mobile phone that includes a user display. The user inputs and outputs may be from a multimodal system. The location sensors may be extant location sensors associated with the site or RFID location sensors placed at the site at the time of mapping. The method may include environmental sensors that transmit environmental signals, which can be interpreted as environmental information and presented in conjunction with the map or to dynamically update the map or generate the map in the first place. The system may also include a mobile computing framework, a location tracking system, an archiving system, a map storage device and an environmental tracking system.

The method may also involve an initial version of the map generated using pre-existing, static data. Some of the location sensors are tagged to objects or building features at the site so that the objects or features can be identified. One of the environmental parameter values may be temperature or chemical concentration. The location signals may be used to calculate the distance between the location of one sensor and the location of every other tracked resource to identify all sensors and associated objects of interest within a pre-determined distance. The method may also calculate the distance between one location sensor and other location sensors to identify all sensors and associated objects of interest within a pre-determined distance of the first location sensor.

Another aspect of the invention provides a method of monitoring personnel movement and status at a site, wherein each personnel is associated with a tracked resource, including: receiving location signals from a plurality of location sensors, wherein at least one of the location sensors is associated with one or more tracked resource associated with a personnel; interpreting the location signals into location information; applying the location information to a map of the site; displaying and archiving the map superimposed with the one or more tracked resource; and repeating the above on an ongoing basis so as to continuously update the location of the tracked resource and the map. The location sensors of the invention may be associated with tracked resources. The displaying may be carried out on a personal digital assistant, laptop computer or a mobile phone that includes a user display. The user inputs and outputs may be from a multimodal system.

The location sensors may be extant location sensors associated with the site or RFID location sensors placed at the site at the time of mapping. The method may include receiving environmental signals from environmental sensors, which can be interpreted as environmental information and presented in conjunction with the map or to dynamically update the map or generate the map in the first place. The method may also include a mobile computing framework, a location tracking system, an archiving system, a map storage device and an environmental tracking system. The method may involve accepting a user query for the user location, determining the user location, and communicating the user location to the user.

Another aspect of the invention provides a method for communication amongst tracked resources at a site, the method including: loading, on a display associated with a first tracked resource, a site view; displaying the site view on a display associated with the first tracked resource; displaying and identifying one or more additional tracked resources on the site view, including a second tracked resource; upon user selection of the second tracked resource on the site view, establishing an audio communication link or video communication link or both between the first tracked resource and the second tracked resource. The site view may be a graphical map, a video of the site or a textual description. The method may include plotting on the site view a graphical or textual indicator representing the tracked resource.

The method may include user selection of the second tracked resource using a stylus. User selection of the second tracked resource may include drawing a shape encircling the indicator representing the second tracked resource. User selection of the second tracked resource may further include the user issuing a voice command to a voice recognition system associated with the first tracked resource. User selection of the second tracked resource specifies an attribute associated with the second tracked resource. The method may include determining the distance between the user and the second tracked resource, wherein the location tracking system determines the location of the user and the location of the second tracked resource, and subsequently calculates the distance between the location of the user and the location of the second tracked resource. User selection of the second tracked resource may further include a voice command that specifies a distance of the second tracked resource from the user, and the second tracked resource is selected due to the determined distance between the first tracked resource and the second tracked resource being less than or equal to the specified distance.

Another aspect of the invention provides a method for establishing bi-directional communication between a first tracked resource and a second tracked resource, the method including: the user of a first tracked resource inputting instructions for a second tracked resource using one or more of voice, text or gesture modalities on a multimodal system associated with a mobile device; the multimodal system processing the instructions inputted by the user; a location tracking system receiving the input instructions; the location tracking system interpreting the input instructions; the location tracking system communicating the instructions to the second tracked resource; and the second tracked resource outputting the instructions on a multimodal interface associated with the second tracked resource, where the output can be one or more of the following types: voice, video, text or gesture.

These and other features and advantages of the present invention will be described below in conjunction with the associated figures.

Objects and Advantages of the Invention

Some objects and advantages of the present invention are to integrate various systems that aid bi-directional communication and that provide location-based services on a mobile multimodal interface (the interface on the mobile multimodal system) to a group of tracked resources. The integration of various systems improves communication and co-ordination between groups of resources.

Some objects and advantages of the invention based on the above objective are:

To provide methods for integration of a location tracking system and a system of bi-directional audio and video communication. These methods allow easy and intuitive setup of bi-directional communication on the basis of displayed location information by the use of modalities such as tapping with a stylus on the displayed location information, thus avoiding delay in communication set up.

To provide methods for integrating environmental sensor information with information about location, enabling complete contextual understanding of the site location on a unified multimodal interface (the interface associated with the mobile multimodal system used by users).

To provide methods for recording and archiving communication between, and movement of, resources for later analysis To provide methods for communication of multimodal instructions (instructions given using more than one mode of communication like voice and text), improving usability of the system To provide methods for multimodal interrogation (a method to query using more than one mode of communication like voice and text) of the location tracking and environmental tracking system To provide methods for plotting graphical maps of a location site superimposed with a plot of tracked resources on a periodic basis, and hence display any changes in the location of tracked resources at the location site. This eases navigation since an accurate plot of the location site is available, and allows for accurate decision making especially during emergency incidents such as a fire.

Still further objects and advantages of the invention will become apparent from a consideration of the ensuing description and drawings.

DETAILED DESCRIPTION OF PREFERRED EMBODIMENTS

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

Embodiments

Mobile computing framework

Figure 1:
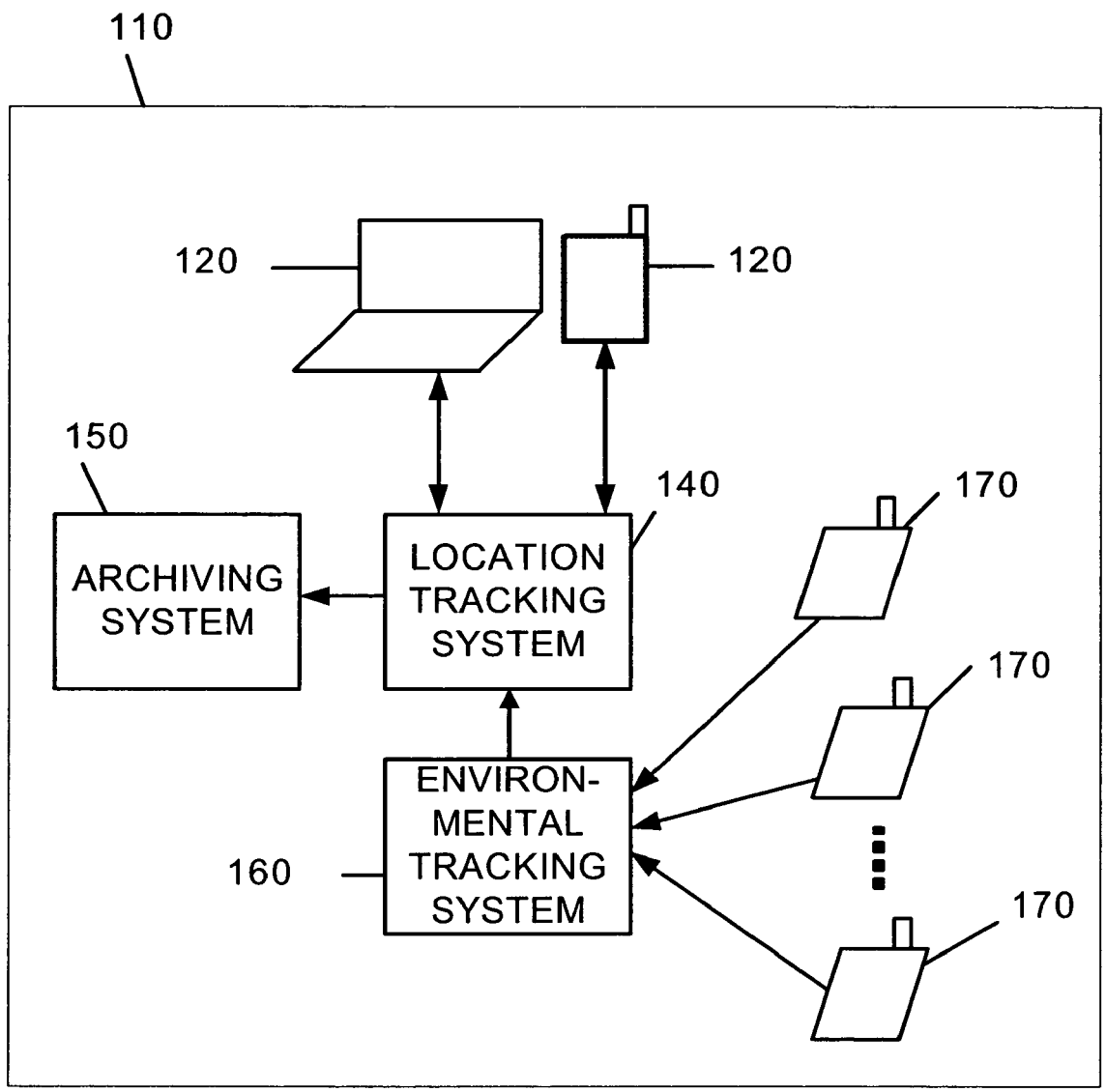
FIG. 1 is a block diagram of the mobile computing framework that integrates the mobile multimodal interface (the interface of the mobile multimodal system) with location tracking system, environmental tracking system and archiving system according to an embodiment of the present invention
Figure 2:
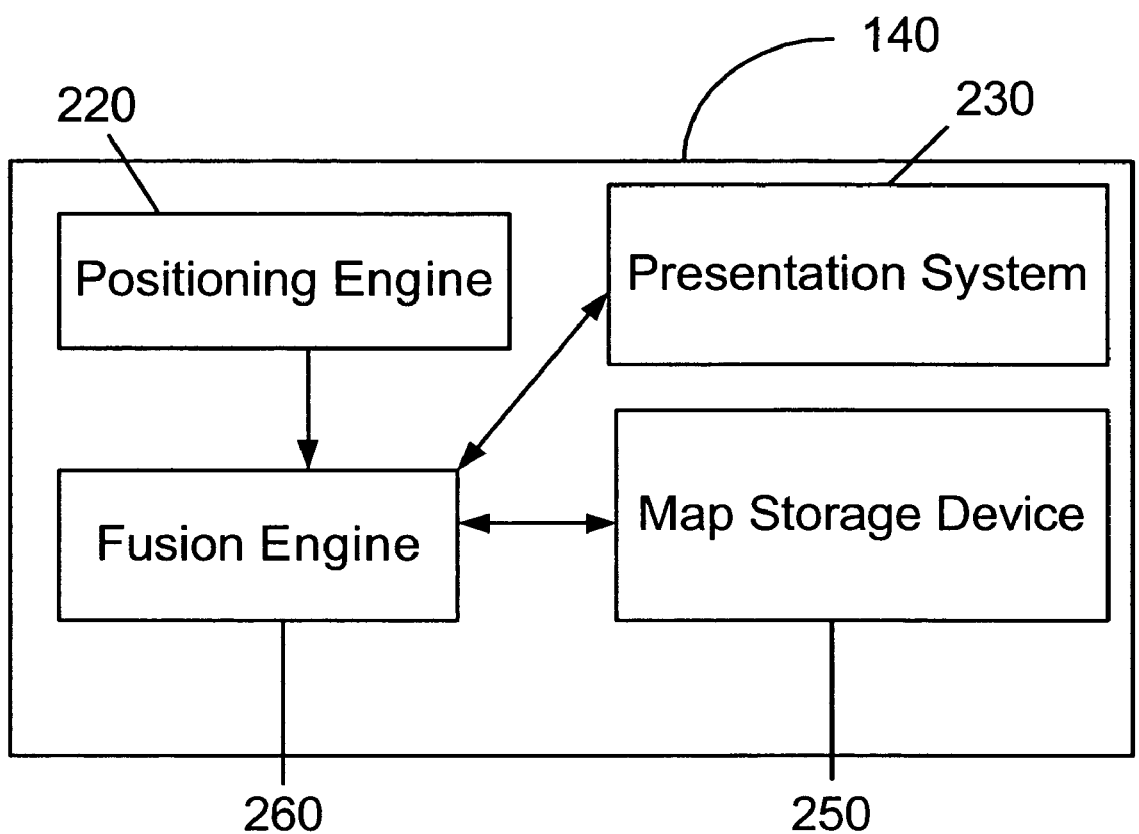
FIG. 2 is a block diagram of the location tracking system

FIG. 1 illustrates an exemplary mobile computing framework 110 in accordance with an embodiment of the present invention. The mobile computing framework 110 comprises application components such as the location tracking system 140, an environmental tracking system 160, and an archiving system 150. It further comprises environmental sensors 170 linked to the environmental tracking system 160, and a number of tracked mobile devices 120 that may be associated with tracked users.

The location tracking system 140 includes a positioning engine 220, a presentation system 230, a map storage device 250, and a fusion engine 260.

The location tracking system 140 uses the positioning engine 220 to determine the location of moving and non-moving tracked resources at a location. The presentation system 230 enables presentation of the current location of all tracked resources to the users. The positioning engine 220 plots the instantaneous location of moving and non-moving tracked resources superimposed on the graphical map of the site location and displays it on the mobile devices of the users. Any change in location of tracked resources is automatically updated on the graphical map by re-plotting the location of moving and non-moving resources on the graphical map on a periodic basis. The presentation system 230 provides the mobile devices with the updated graphical map over the wireless communication network.

Periodic updates of the graphical map by the location tracking system 140 enables the user to see their position, as well as the position of other tracked resources close to them on real time basis. This helps the user navigate through their environment. An example here is a firefighter involved in extinguishing a fire inside a building. Suppose that a fire extinguisher that is being tracked is destroyed by the fire. The location tracking system 140 now detects the absence of the fire extinguisher. The map is updated to show absence of the fire extinguisher, and this information is communicated to users of the mobile device.

A variety of positioning engines for indoor tracking can be used in this system. These may include systems that use radio signals, which follow protocols such as IEEE802.11b, Bluetooth, Ultra Wide Band ("UWB") or Zigbee. The positioning techniques used by these engines may include proprietary techniques based on the signal strength or time information of the radio signals. Furthermore, the radio signals mentioned above may be exchanged between tracked devices or between tracked devices and so-called beacons, which are pre-installed radio frequency transceivers.

In another embodiment, a positioning engine 220 may use a combination of motion sensing with infrared or other communication techniques for identifying the position of tracked resources.

For outdoor positioning, a positioning engine 220 may include use of GPS receivers.

A hybrid of positioning techniques mentioned above may be used for improved accuracy. The positioning engine 220 can integrate information from both outdoor and indoor positioning engines to determine the location of tracked resources.

Most positioning systems will have a client and a server software component. The client software component resides on the tracked device or tracked resource and communicates signal strength or timing information over a wireless connection to the server software component that resides on a computer server.

The presentation system 230 communicates and presents information to the mobile multimodal system. The presentation system 230 includes (a) a component that receives information requests from mobile multimodal systems/devices, and (b) a component to respond to the requests from the mobile multimodal system. The presentation system 230 manages all user interaction between the location tracking system 140 and the user.

It is also the role of the presentation system 230 to facilitate bi-directional audio and video communication between the tracked resources. It can provide this facility through the collaboration components of a server framework such as the SAP NetWeaver collaboration platform.

In a one embodiment the presentation system 230 comprises a platform such as SAP NetWeaver, which includes a web server and an application server that communicates to the mobile devices over a Hypertext Transfer Protocol ("HTTP").

In a one embodiment, the presentation system 230 sends the XHTML+Voice documents to the mobile device in response to said HTTP requests from the mobile device. The presentation system 230 may also use an "HTTP-push" mechanism to send updates to the mobile device without the HTTP request for the update from the mobile device. The XHTML+Voice document may consist of maps and voice dialogs to navigate the maps or access other information.

In a one embodiment the mobile device 710, for its multimodal system, uses a multimodal browser that may use a multimodal markup language such as "XHTML+Voice", a combination of eXtended Hypertext Markup Language ("XHTML") and Voice eXtended Markup Language ("VXML"). The XHTML+Voice document may consist of maps and voice dialogs to navigate the maps or access other information. The XHTML+Voice documents are parsed, interpreted and rendered by the multimodal browser on the mobile device.

In a one embodiment, it is the role of the multimodal browser to generate audio output for automated messages using the text-to-speech ("TTS") synthesis capability. The multimodal browser also takes voice input on the mobile device, interprets the same based on the grammar described in the XHTML+Voice documents, creates an XHTML+Voice document based on the user input and converts it into HTTP requests to the presentation system 230.

The multimodal system on the mobile device 710 may also be formed by other combinations of speech interfaces (by Voice Speech Recognition system, for example) and display interfaces (a Java Applet, or a Scalable Vector Graphics client, for example)

In a one embodiment, the presentation system 230 may also manage the ongoing audio and video communication between multiple tracked resources. The presentation system 230 provides a software or hardware digital communication switch for connecting, routing and managing multiple streams of bidirectional audio and video communication.

In a one embodiment the fusion engine 260 is a software component that integrates input information from various components connected to it and aggregates this information for output to tracked resources through the location tracking system. In one embodiment, the different components connected to the fusion engine 260 are the positioning engine 220, the presentation system 230 the map storage device 250 and the environmental tracking system 160. The fusion engine receives as input environmental sensor signals from the environmental tracking system 160, location information from the positioning engine 220 and bi-directional audio and video communication information from the presentation system 230. The fusion engine 260 integrates the input information from the various components connected to it, aggregates this information for output and communicates the integrated output information to the mobile multimodal system 120 via the presentation system 230. The fusion engine 260 also sends information collected to the archiving system 150 on a periodic basis.

In a one embodiment, the map storage device 250 is a software database of maps and consists of map images stored in bit map or Scalable Vector Graphics ("SVG") or similar formats. It also includes information regarding zones and various other map features.

Figure 3:
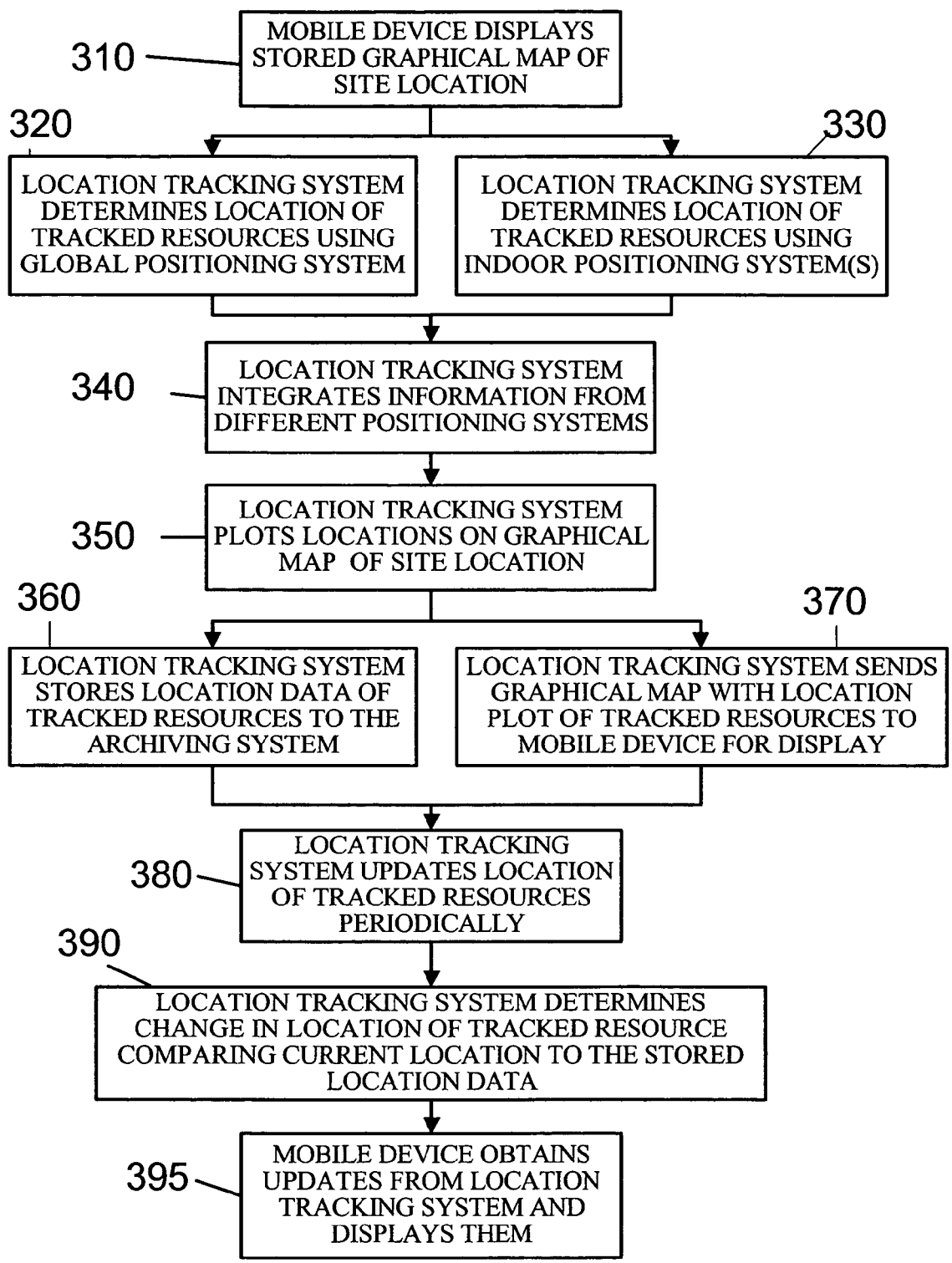
FIG. 3 is a flowchart illustrating a method for uploading a graphical map site view according to an embodiment of the present invention

The location tracking system 140 may be located on the same computing device, such as a server running the Linux operating system, or its components may be distributed on multiple computing servers, or even on the tracked resource itself Operation of location tracking system In FIG. 3, a stored graphical map is loaded onto the mobile display interface from the map storage device via the presentation system 230 (310). The location tracking system 140 determines the location of all the tracked resources using one or more of the various positioning techniques described in, for example, 320 and 330. The location tracking system 140 integrates the location information from the various positioning techniques described in 320 and 330 (340), and then plots the location of tracked resources onto the graphical map loaded from the map storage device (350). The presentation system 230 displays the graphical map superimposed with the plot of tracked resources on the mobile multimodal system (360) and also sends the graphical map to the archiving system (360) that archives the map. Location information of tracked resources is updated continuously (380). Any change in location of tracked resources is determined (390) and the graphical map is updated (395).

Zoning method

The graphical map displayed on the mobile device includes pre-determined zones. A zone, in the context of the mobile computing framework, is an area or a region of the location site. The zone is demarcated on the graphical map. One or more tracked resources may be present in a zone at any given time. For example in a building site with many floors, any floor may be defined as a zone.

A user can modify the pre-determined zones by using various methods. One such method is modifying the boundaries of the zone by drawing the desired extents using stylus on the graphical map display. On drawing the desired zone using the stylus, the new drawn zone gets highlighted. On clicking the highlighted zone, an option to save the new drawn zone is provided to the user. The user can save the newly defined zone. This may also be communicated to all the other users. A practical use of this tool comes in incidents such as fire, when an incident commander can update the zone affected by fire on the graphical map, and communicate it to all other users.

In a one embodiment, the graphical map is an XHTML+Voice document displayed on the multimodal system. The map is rendered on the mobile device by an XHTML+Voice browser. In one embodiment, the XHTML+Voice document consists of handler code written using Javascript to handle various events such as a stylus gesture or a verbal utterance, or keypad input. When a user uses stylus for instance to manipulate the extent of the zone (also referred to user input or input) on the user interface, an event occurs. The pre-defined handler for stylus input is activated and the user manipulations/inputs are rendered on to the XHTML+Voice document. The user can then save the manipulations/inputs made on the XHTML+Voice document and communicate the same to the presentation system 230.

In a one embodiment of the system, the user who can manipulate the pre-determined zones of the graphical map needs to be authorized; in other words, the zone modification facility is restricted to a smaller set of users or only to the command post managing an emergency in a fire situation. The presentation system 230 can maintain the authorization method, which is part of the location tracking system 140.

Figure 4:
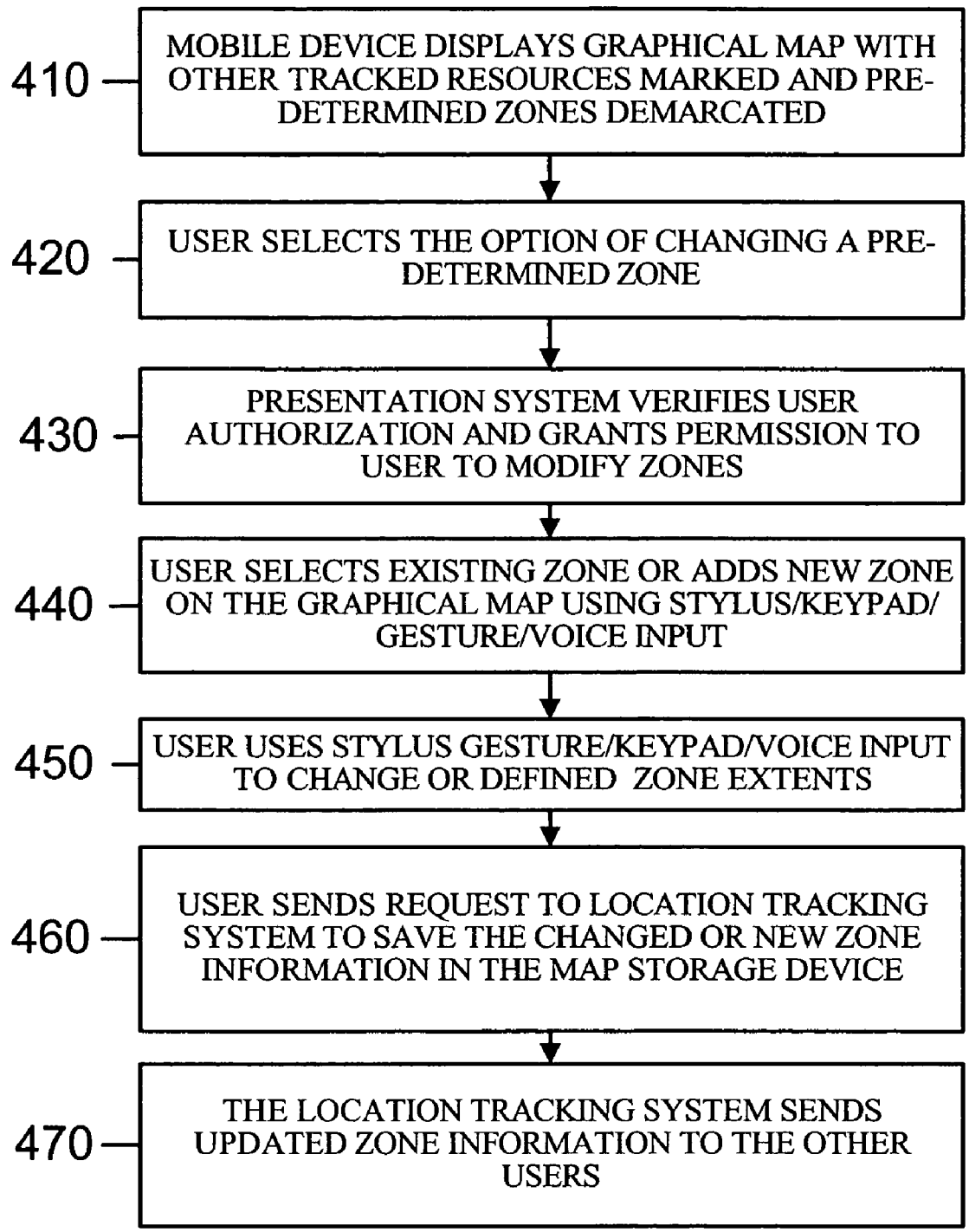
FIG. 4 is a flowchart illustrating a method for user manipulation of pre-determined zones in a graphical map site view of a location according to an embodiment of the present invention

In FIG. 4, a graphical map plotted by the location tracking system 140 is displayed on the device (410). The graphical map displays predetermined zones and tracked resources. The user selects the option of changing the zone layout by tapping using a stylus or by typing on a keypad or by issuing a voice command (420). The user is authorized to manipulate the pre-defined zones of the graphical map by an authorization system, which may be part of the location tracking system 140 (430). An authorized user can now select a zone for modification using a stylus or can choose to add a new zone by selecting the appropriate option (440). The user can, through voice commands, stylus gestures or keypad input, now modify the selected zone or define the extents of a new zone (450). The new or modified zone drawn is sent to the location tracking system 140 (460). The new zone or the updated zone is updated by the location tracking system 140 on the graphical map plot and is subsequently displayed on the multimodal interfaces of all users (470) using other mobile devices.

Environmental tracking system

The environmental tracking system 160 shown in FIG. 1 is connected to the location tracking system 140, and more specifically to the fusion engine 260 component of the location tracking system 140.

Buildings are often equipped with various types of environmental sensors that gather data about the milieu around them. Some examples of such environmental sensors are temperature sensors, motion sensors and the like. These environmental sensors are also connected to a computing network (wired or wirelessly). Alternately, the personnel at the site can deploy moving or non-moving environmental sensors that can sense environmental parameters such as temperature and humidity at an incident site. These moving and non-moving environmental sensors are capable of forming ad hoc wireless networks among themselves to communicate data.

The environmental tracking system 160 is made up of environmental sensors, a computing network, and a software or hardware component to interpret relayed signals and to determine the location of the environmental sensors relaying these signals. Using a computing network, it is possible to connect the environmental tracking system 160 with the mobile computing framework 110 also. Using common communication methods such as XML data exchange over HTTP, the environmental tracking system 160 can communicate the environmental information and the location of the environmental sensor to the mobile computing framework 110.

The environmental sensors 170 used in the environmental tracking system 160 may measure environment parameters such as temperature and pressure, may detect motion and/or sound, and may even record motion using video technology. Furthermore, these sensors may be connected to each other and to tracking systems using wired or wireless networking technology. Wired networking topology could be based on wide area network ("WAN") or local area network ("LAN") and the wireless networking technology may include systems that use radio signals.

In a one embodiment, the environmental sensors 170 include tiny self-contained devices with ad hoc wireless networking abilities, developed by universities and sold commercially by companies such as Crossbow Technology, Inc., 41 Daggett Dr., San Jose, Calif. 95134, and often called "Motes" or "Smart Its." Sensors 170 could also be radio frequency identification ("RFID") tags containing small amounts of data, which contain active (battery-equipped) or passive transceivers, and which are used for tracking equipment and goods.

According to one embodiment, the environmental tracking system 160 uses sensor technology that contains a sensing device and a receiving mechanism where the receiver aggregates and/or interprets the signals transmitted by the environmental sensors. The receiver may be a mobile device or a server connected with wired or wireless networking technology to the environmental sensors. This receiver integrates and analyzes input from all environmental sensors networked to it. The receiver also converts the interpreted environmental information into a format such as extensible Markup Language ("XML") and communicates the same to other software components.

Figure 14:
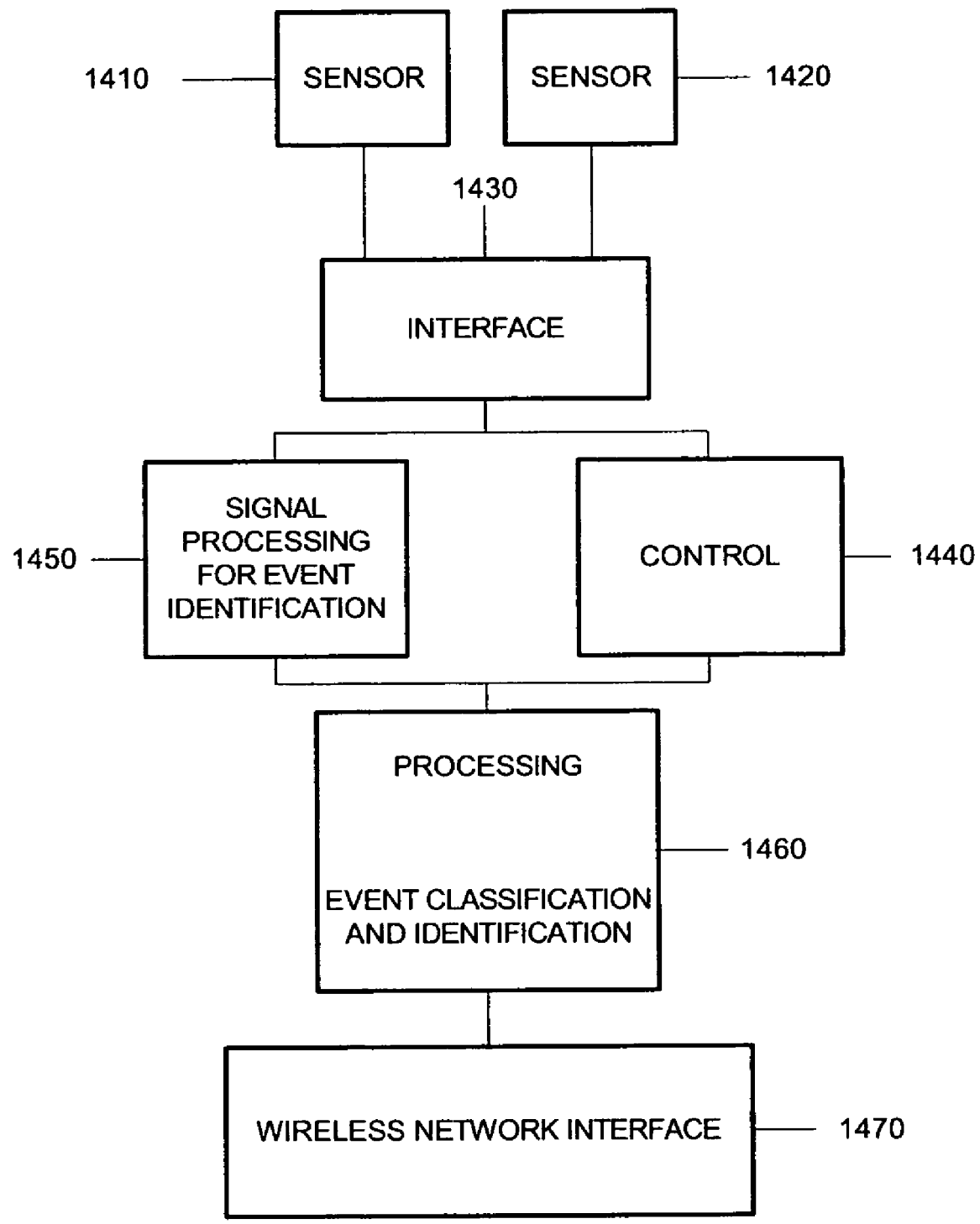
FIG. 14 is a block diagram of an environmental tracking system that integrates signals from environmental sensors and communicates the corresponding information to the location tracking system.

Various computing networks can be used to implement the environmental tracking system, for example the one described in FIG. 14 below, or the WINS NG network disclosed in U.S. Pat. No. 6,735,630 issued to Gelvin (see for example FIG. 16 of Gelvin).

In a one embodiment, the environmental networking system 160 consists of the following components (FIG. 14):

A set of sensors 1410 and 1420, sensing various environmental and other parameters, An interface 1430 to integrate the environmental sensor signals and to send it to the signal processing system as well as to the control system, Signal Processing system 1450 for identifying/interpreting events based on pre-defined event criteria, A control system 1440 to control the flow of events, A processing system 1460 that classifies events and environment sensor signals and sends them over the wireless network to other systems such as the location tracking system 140, and A wireless network connection 1470 to communicate event and environmental sensor information.

The different components described above may be distributed on one or more sensor devices or on different computers or servers on a network.

In the mobile computing framework 110, the environmental tracking system 160 is connected to a larger system, such as the location tracking system 140 over a wired or wireless connection. The location tracking system 140 interprets location information updates or event information from the environmental tracking system 160 as an XML document over an HTTP connection. Parsing of the document by the fusion engine 260 in the location tracking system 140 renders the location of the environmental sensor and environmental information from the environmental tracking system 160 to the location tracking system 140. Combining the location of the environmental sensor that detects an event and the location of tracked resources on the same graphical map co-ordinates of a location site, the positioning engine 220 in the location tracking system 140 can locate the tracked resources within a certain distance from the event.

In an application of the one embodiment, in location sites equipped with environmental sensors networked to a computing framework, the environmental tracking system 160 receives and interprets signals from environmental sensors at a site to determine the occurrence of an event. Events are pre-defined based on a combination of environmental information—a high smoke sensor reading, for example, is indicative of fire. If the environmental tracking system 160 detects the occurrence of an event, the environmental tracking system 160 immediately informs the location tracking system 140 of the location of event, and the nature of the event. The location tracking system 140 then communicates the occurrence of the event to all tracked resources within a certain predetermined distance from the event—for example, all firefighters are instructed that the fire has now extended to room 11 of the building.

Figure 5:
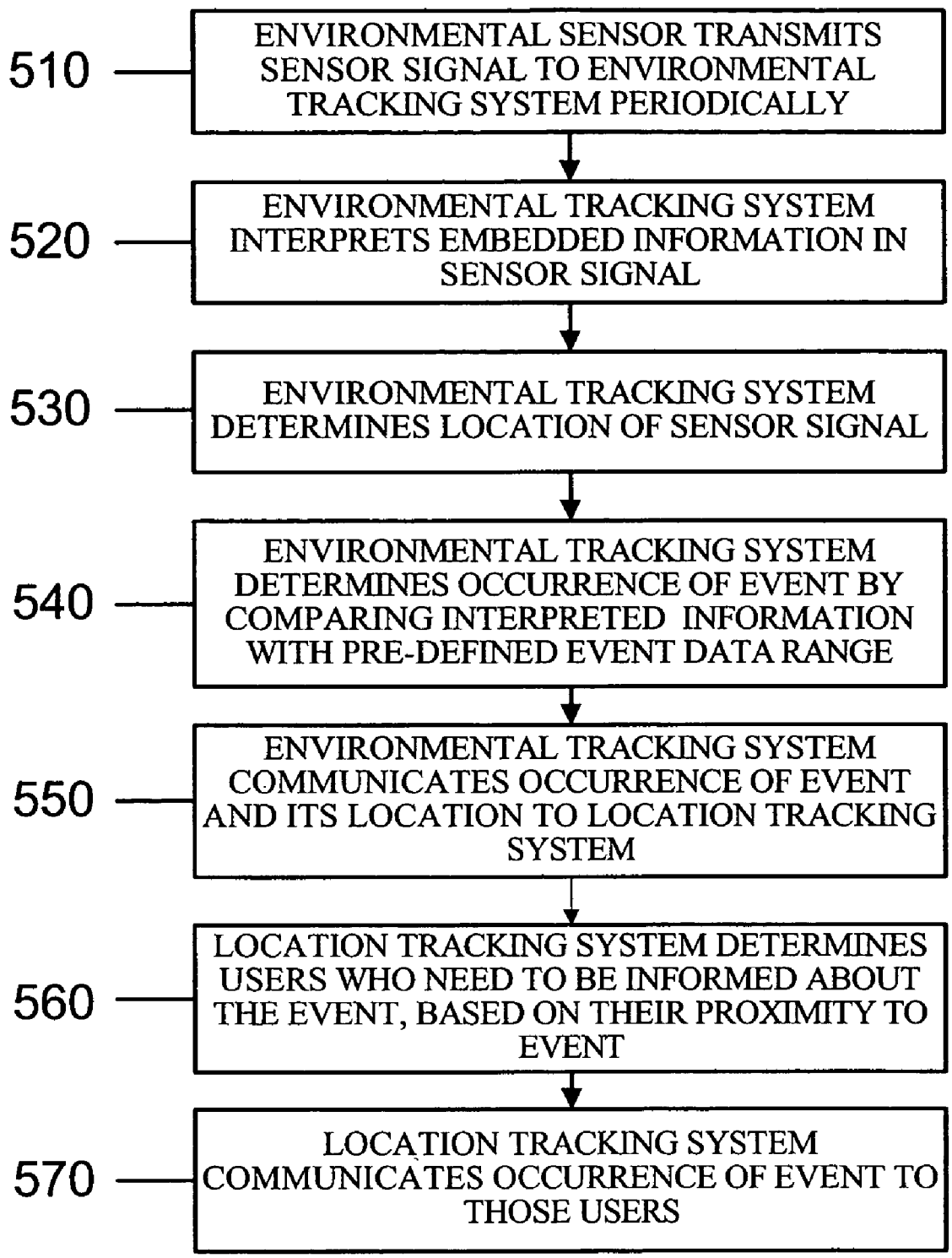
FIG. 5 is a flow chart illustrating a method for tracking of environmental sensor signals, interpreting environmental signals from the environmental sensors and communicating information to tracked resources according to an embodiment of the present invention

In FIG. 5, the environmental sensor periodically transmits the environmental sensor signal to the environmental tracking system (510). The environmental sensor signal is interpreted by the environmental tracking system 160 for embedded environmental information (520). The location of the environmental sensor transmitting the signal is determined (530) by The environmental tracking system 160. The environmental tracking system 160 compares the environmental sensor information with pre-defined environmental signal reading thresholds to determine the occurrence of an event (540). The environmental tracking system 160 communicates the occurrence of an event and its location to the location tracking system 140. The location tracking system 140 locates tracked resources in proximity of the event location by comparing the location of tracked resources relative to the location of event occurrence (560). The location tracking system 140 communicates the occurrence of an event to these tracked resources (570).

Archiving system

The archiving system 150 is connected to the location tracking system 140 in the mobile computing framework 110.

The archiving system 150 is a multimedia database that can store large amounts of information in real time.

An archiving system 150 is a system for recording all bi-directional communication, all locations of tracked resources and other data. In a one embodiment, it is a large multimedia database that records all bi-directional communication and all movements of tracked resources. It has a processor that time stamps the information stored. The processor also retrieves, replays, classifies and analyzes the stored information. The archiving system 150 is connected to the location tracking system 140 and more specifically to the fusion engine 260.

The archiving system 150 records the information from the fusion engine that aggregates information from different parts of the mobile computing framework. The archiving system has a processor that timestamps all the information before it is stored. In one embodiment the archiving system 150 records through the fusion engine 260 all the video and audio streams of communication between tracked resources, as well as the HTTP requests from the tracked resources to the presentation system 230, and the XHTML+Voice documents from the presentation system 230 to the mobile devices. The archiving system 150 also records all the environmental information and the location information of an event as well as the location information of the tracked resources aggregated by the fusion engine 260. The archiving system 150 can also be connected to an analytics system that retrieves, replays, classifies and analyzes information during and after the incident for better learning.

In an example of the operation of the archiving system 150 embodiments, the occurrence of an event and its location, as determined by the environmental tracking system 160, is communicated to the fusion engine 260 of the location tracking system 140. The fusion engine 260 interprets the environmental tracking system 160 inputs, and communicates the location of the event to the positioning engine 220 in the location tracking system. The positioning engine 220 in the location tracking system 140 plots the location of the event on the graphical map of a location site and combines this with the plot of tracked resources on the same graphical map. Having made the graphical map plot, the positioning engine 220 identifies all users within a certain distance from the event. This is done by measuring the distance between location of tracked resources and the event location by the positioning engine 220. Subsequently, the positioning engine 220 communicates the occurrence of event to the tracked resources close to the event via the presentation system 230. Upon event detection the location tracking system 140 also initiates the archiving system 150 to record continuously all movements and bi-directional communication of all tracked resources.

Figure 6:
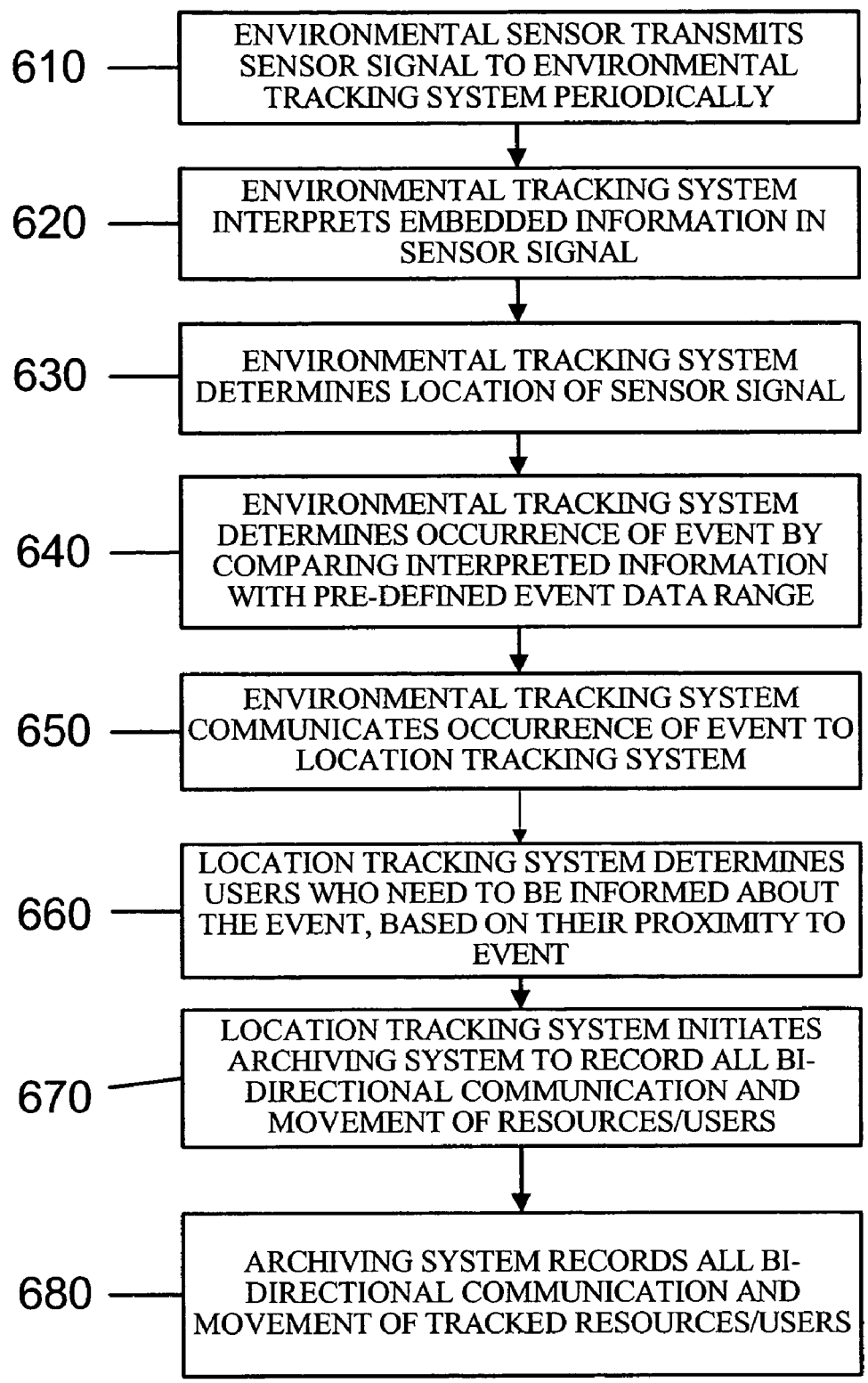
FIG. 6 is a flow chart illustrating a method for archiving movements and bi-directional communication of tracked resources associated with an event according to an embodiment of the present invention
Figure 7:
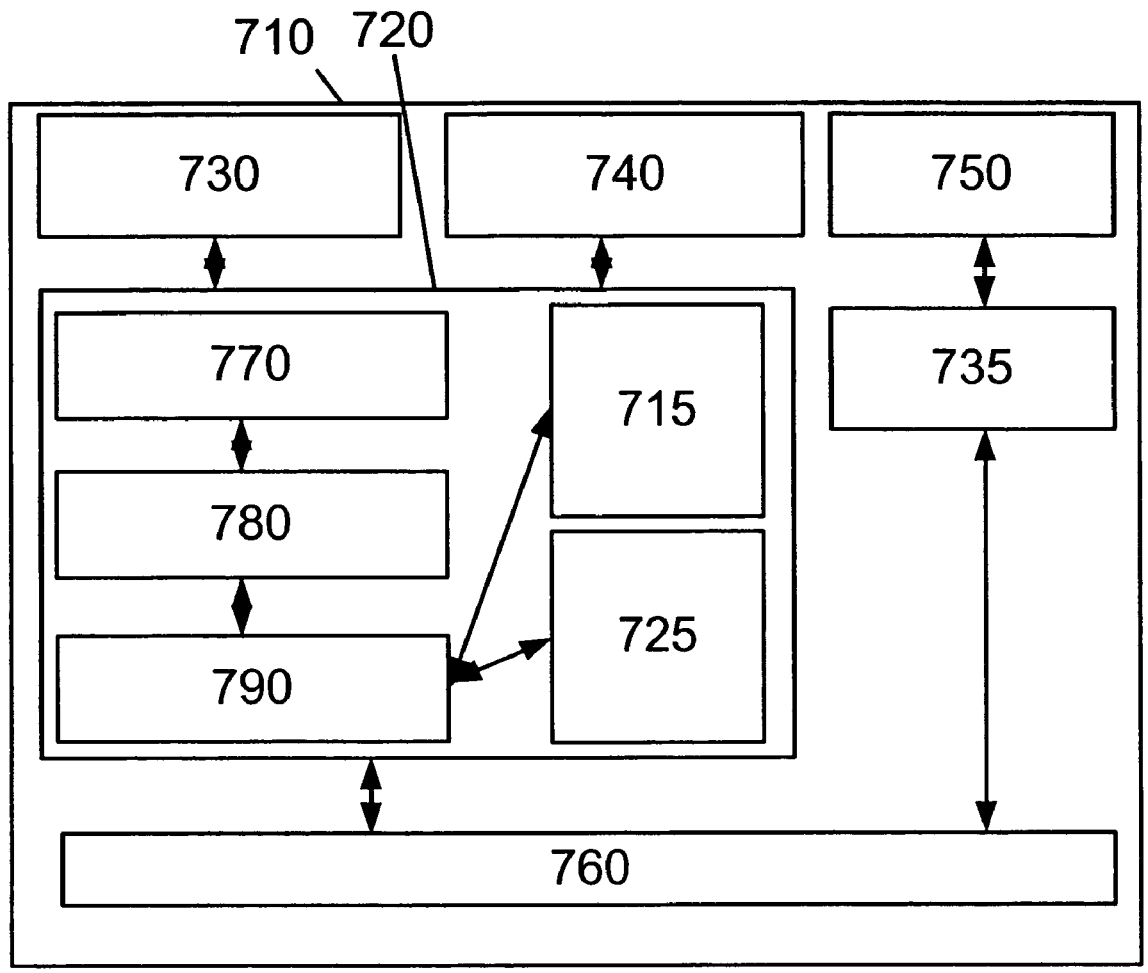
FIG. 7 is a block diagram of a mobile device equipped with the multimodal interface according to an embodiment of the present invention

In FIG. 6, each environmental sensor periodically transmits signals to environmental tracking system 160 (610). The signals are interpreted and aggregated by the environmental tracking system 160 (620). The location of the environmental sensor signal is determined (630) by the environmental tracking system 160. The environmental tracking system 160 compares the environmental sensor signal readings with pre-defined signal thresholds to determine occurrence of event (640). Upon the environmental tracking system detecting the occurrence of an event, the environmental tracking system 160 communicates the occurrence of the event and its location (650) to the location tracking system 140. The location tracking system 140 then locates users in proximity of the event location by comparing the event location with the tracked users' location (660). The location tracking system 140 also instructs the archiving system 150 to record all communication and movement of the tracked resources (670). All bi-directional communication and tracked resource movements are recorded by the archiving system 150 (680) with a timestamp.

Mobile multimodal system

The mobile multimodal system 710 is made up of the following components:

An audio input/output system consisting of a microphone, a speaker and an audio codec 740

Display output and keypad/stylus input 730

A video input/output system consisting of a camera and a video codec 750

In a one embodiment a multimodal interface formed using a multimodal browser 720 described in greater detail below A video buffer 735 that enables streaming of video information in both directions A WiFi communication capability including the software drivers and the antenna 760

The multimodal browser 720 consists of the following components:

A parser 790 that parses the multimodal documents containing XHTML+Voice, SALT (Speech Application Language Tags) or similar markup, and converts them into DOM (Document Object Model)

A speech-to-text engine 715 and an automatic speech recognition engine 725 that combine to provide voice input/output capabilities A renderer 770 to render the display elements onto the visual display, and to take keypad/stylus input A synchronization element 780 that synchronizes the visual and audio user interaction; a Javascript engine that allows for dynamic client-side interaction on top of the Document Object Model It is the role of the multimodal browser of the mobile multimodal system to generate audio output for automated messages using the TTS synthesis capability. The multimodal browser also takes voice input/voice utterance on the mobile device, interprets the same based on the pre-defined voice handlers described in the XHTML+Voice document object and converts it into HTTP requests to the presentation system 230. In a one embodiment, the mobile device has a multimodal browser that uses a multimodal markup language such as XHTML+Voice; a combination of eXtended Hypertext Markup Language (XHTML) and Voice eXtended Markup Language (VXML) on top of a Document object Model to create, manipulate and render XHTML+Voice document objects.

The multimodal browser creates the HTTP requests based on the inputs from the user at/on the multimodal interface associated with the mobile multimodal system. The HTTP requests created by the multimodal interface are sent to the location tracking system. The location tracking system 140 in response sends to the user of the mobile device XHTML+Voice document that may consist of maps, voice dialogs and handler code to navigate the maps or access other information. The multimodal browser also renders, parses, and interprets the XHTML+Voice documents received from the location tracking system 140 and communicates this information to the user of the mobile multimodal system.

The multimodal interface on the mobile device may also be formed by other combinations of speech interfaces (ViaVoice Speech recognition system, for example) and display interfaces (a Java Applet, or a Scalable Vector Graphics client, for example).

In an example of the use of the mobile multimodal system, multimodal techniques are used to load a live video view of the location. This can be done using techniques such as tapping using keypad/stylus gesture, the graphical indicators on map displayed on the screen of the mobile device, or by issuing a verbal command, interpreted by the speech recognition system on the mobile device. The graphical indicators may represent (a) a video camera which records site view or (b) a tracked resource, which transmits the video view recorded by a camera associated with its mobile multimodal interface. Tapping the graphical indicators identifies and establishes a video link with the specific resource to relay the video view.

Multimodal techniques are used to establish an audio link with tracked resources of interest. This can be done using similar techniques as above.

Figure 8:
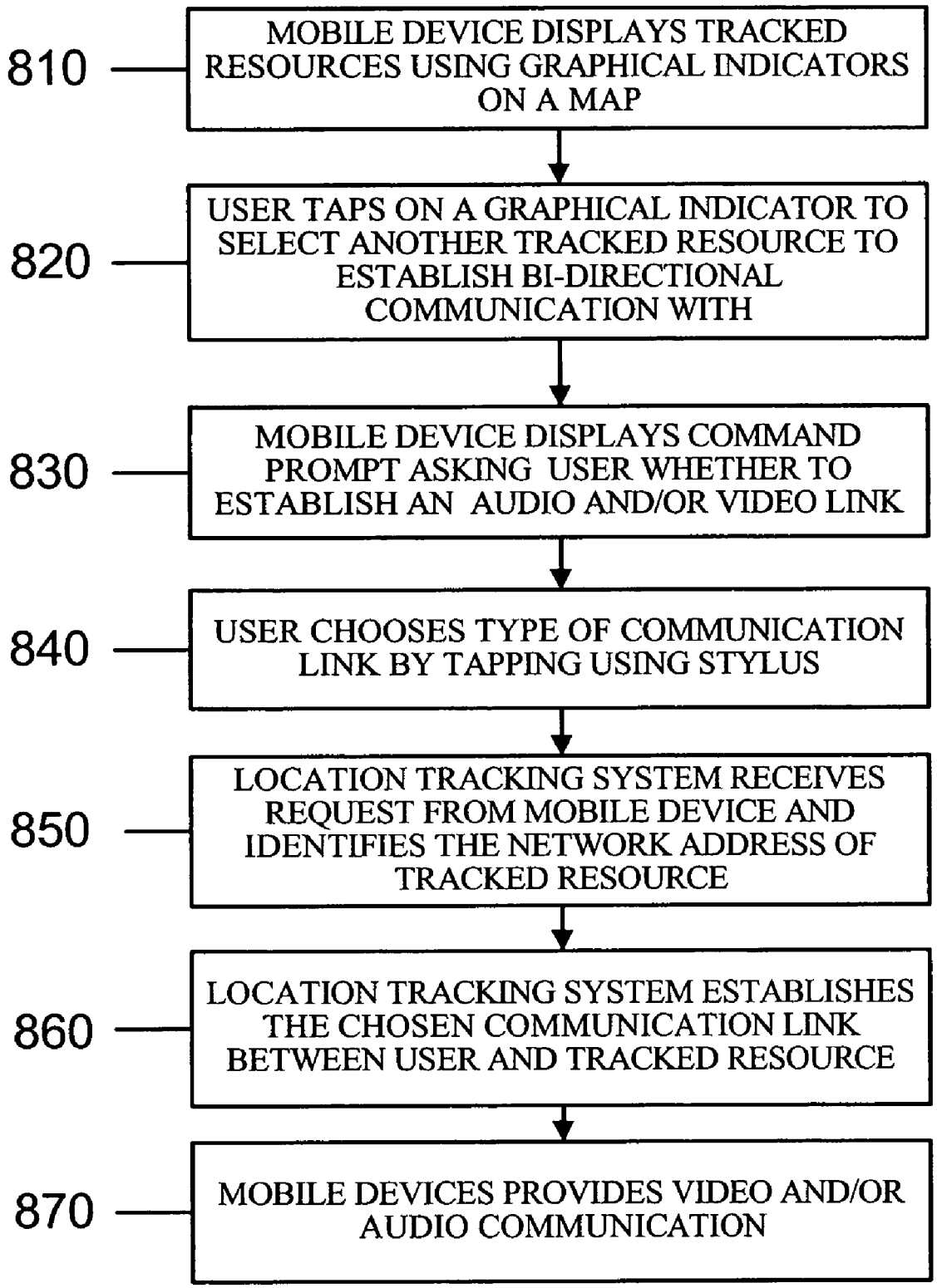
FIG. 8 is a flow chart illustrating a method for initiating an audio-video link bi-directionally between two resources according to an embodiment of the present invention

In FIG. 8, a graphical map (XHTML+Voice document) is displayed on the display of the mobile device (810). The tracked resources are displayed on a graphical map using graphical indicators such as icons or dots. A user of the mobile interface can select another user or tracked resource to establish audio/video communication with by tapping on the icon or dot on the display associated with this tracked resource (820). In certain embodiments, the user can also be chosen using a voice command that is interpreted using a voice recognition engine. The voice command in such a case identifies the tracked resource by a unique attribute associated with the tracked resource. Once the tracked resource is identified, a command prompt appears on the display interface asking the user to choose which communication link is to be set up with the tracked resource (830). The user chooses the communication link of choice (either audio or video for example) by tapping the respective command prompt (840). The user input commands are event occurrences (tapping or using voice to identify tracked resources and the choice of communication link) and invoke the Javascript code on the XHTML+Voice document object model displayed on the display interface. The user commands are then sent to the location tracking system as HTTP requests by the browser. Upon receiving the input command from the user that is sent to the location tracking system as an HTTP request, the location tracking system 140 maps the chosen tracked resource by its location co-ordinates on the graphical map to its unique IP address or unique interface address (850). A communication link of users choice is set up between the user and the chosen tracked resource using multimedia-streaming protocols (860). The output is displayed on the display interface of the user (870).

Multimodal instructions

Figure 9:
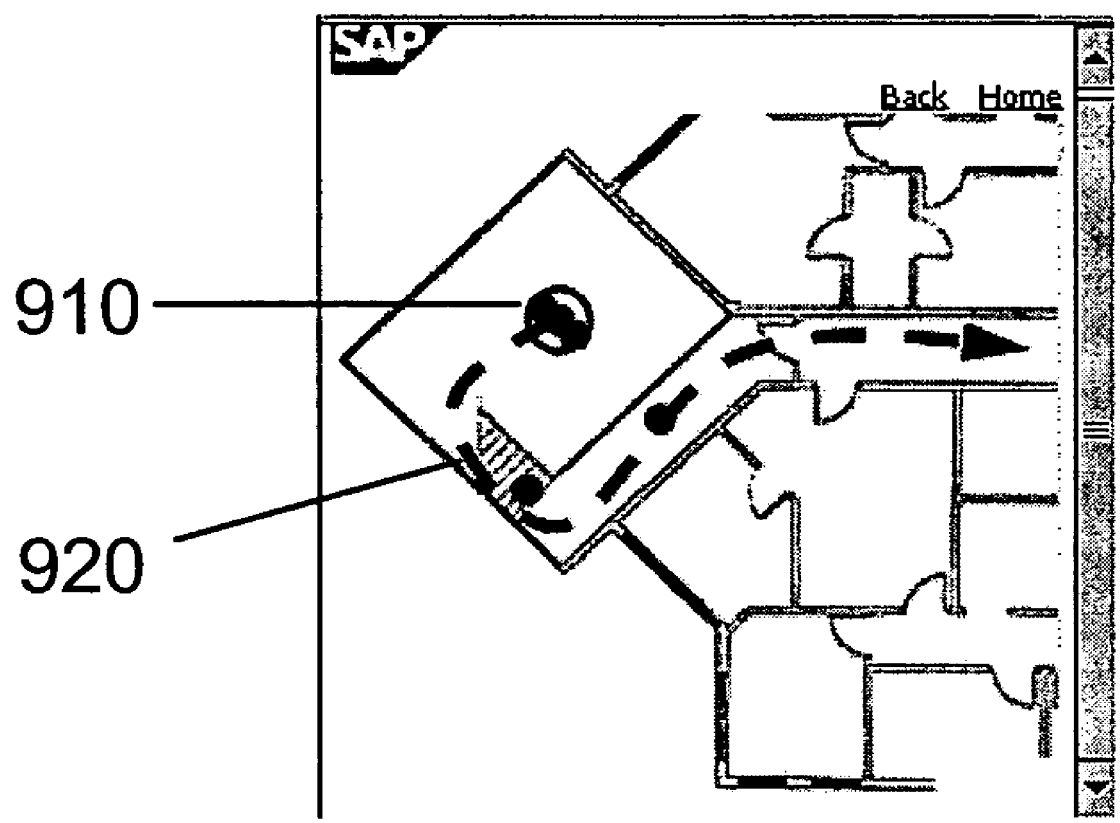
FIG. 9 is an exemplary screen shot of a mobile multimodal interface used for input of multimodal instructions and for output of multimodal instructions according to an embodiment of the present invention
Figure 10:
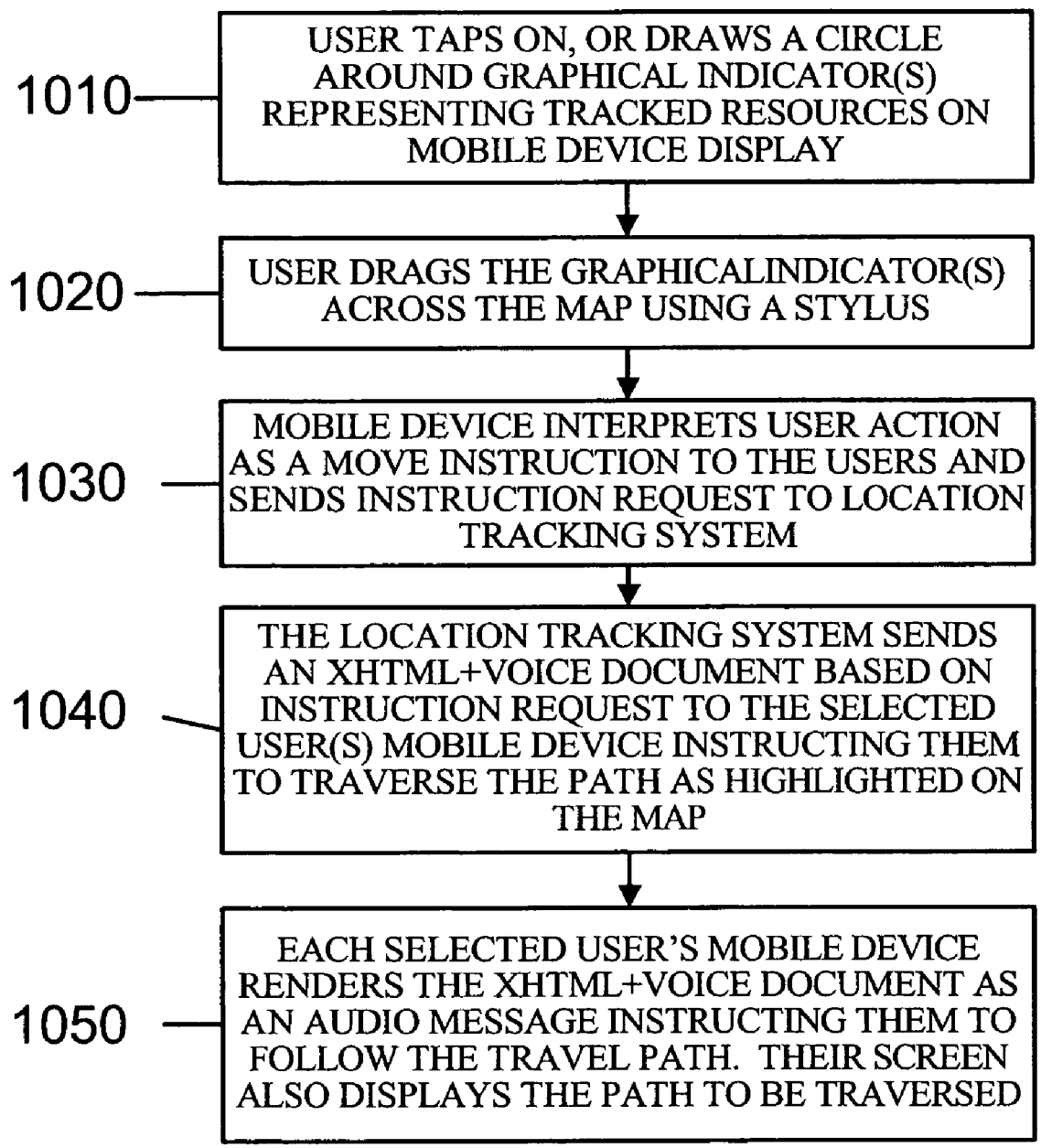
FIG. 10 is a flow chart illustrating a method for giving multimodal instructions according to an embodiment of the present invention

In another example of use of the mobile multimodal system, multimodal techniques are used to instruct users of the mobile multimodal system. For example, as shown in FIG. 9, if one user drags a highlighted graphical indicator (representing a second user) through a path on the graphical map, the second user will be issued audio instructions to walk along that path. Other gestures/taps on the screen may result in other types of verbal or visual instructions being issued to the users.

Alternately, verbal instructions such as a call for "Help" from a user to the mobile multimodal system associated with them may result in visual messages such as a flashing indicator on all other users' mobile devices.

Operation of multimodal instructions

The user can select a tracked resource by use of a stylus to encircle graphical indicators of tracked resources plotted on a graphical map, displayed on the display of the mobile device (1010). A user can issue various commands to the selected icons, and in one instance it is done by dragging the graphical indicator across the graphical map (dragging the graphical indicator is a pre-defined event) using a stylus (1020). The appropriate pre-defined JavaScript handler code in the XHTML+Voice document object model will be activated on the basis of this event, and the event handler will communicate this command to the location tracking system as an HTTP request (1030). In response the location tracking system creates and forwards the command as an XHTML+Voice document to the selected user(s) instructing them to traverse the path as highlighted on the map (1040). Each selected user gets an audio message instructing them to follow the travel path. Their screen also displays the path to be traversed (1050).

FIG. 9 illustrates an exemplary multimodal instruction input and out put as seen on a multimodal interface of a mobile device. A user such as a firefighter, who is a tracked resource, is being asked to leave a building by another user who may, for example, be an incident commander. To do so, the incident commander clicks on a dot representing the firefighter on the display screen. Then he or she makes a stylus gesture on the touch-sensitive display of their mobile device. This results in a request to the location tracking system, which sends an instruction as an XHTML+Voice document to the firefighter's mobile device. The firefighter gets the instruction in two different modalities (audio and visual) at once on the mobile device. An audio instruction is generated using TTS synthesis on the device. FIG. 9 represents the display (display of video instruction) of this user's mobile device. 910 represent the firefighter on his or her mobile device and 920 is the path on the map that he or she is being asked to follow to exit the building.

Multimodal interrogation

In an embodiment of the use of the mobile multimodal system, the tracked resources can interrogate the location tracking system 140 using multimodal techniques. The interrogation by a tracked resource can be of two types (a) a voice command that can be recognized with the help of a pre-defined voice grammar, or (b) a pre-defined set of commands triggered by keypad/stylus gestures/taps on the touch-sensitive display of the mobile device. For example when a user taps/touches the displayed graphical indicator for interrogation it launches the interrogation mode. An XHTML+Voice document is loaded on to the mobile device to facilitate user queries/interrogations. The user can interrogate the device using pre-defined voice grammars such as "Where am I," which sends a request to the presentation system 230 which will respond with the appropriate answer.

Operation of multimodal interrogation

Figure 11:
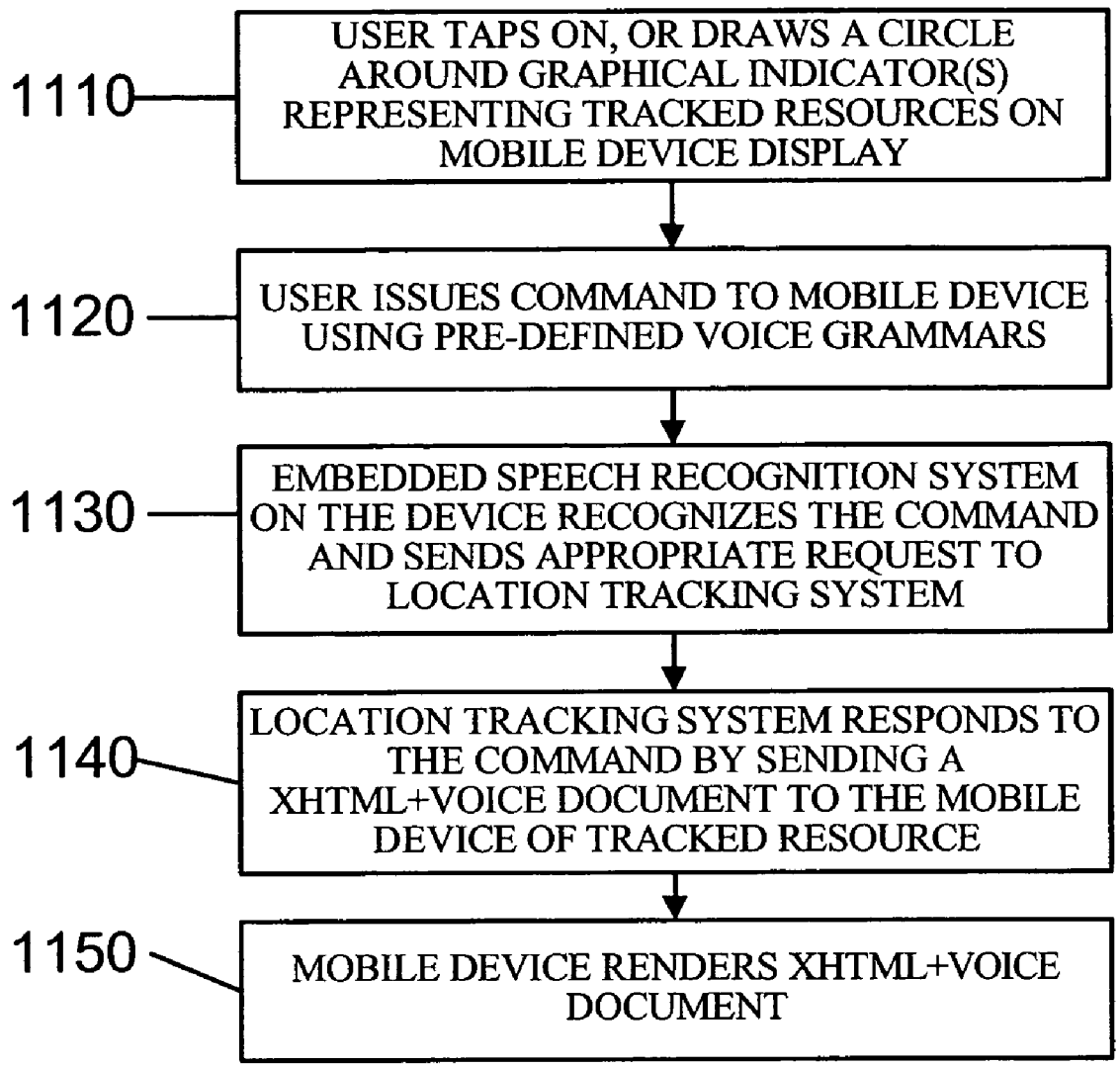
FIG. 11 is a flow chart illustrating a method for interrogating the location tracking system according to an embodiment of the present invention
Figure 12:
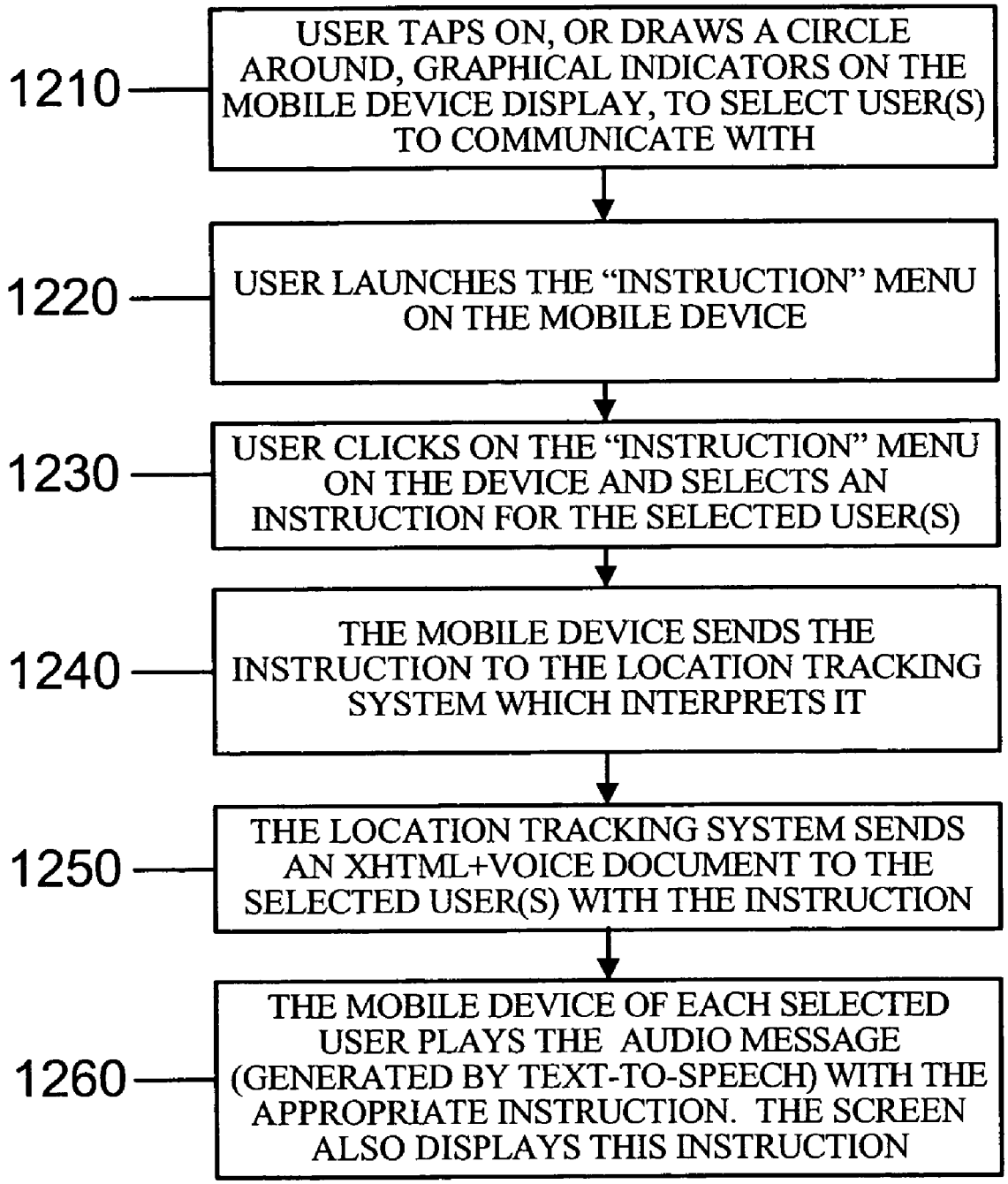
FIG. 12 is a flow chart illustrating a method for issuing multimodal instructions to users of a multimodal interface (interface associated with mobile multimodal system) according to an embodiment of the invention
Figure 13:
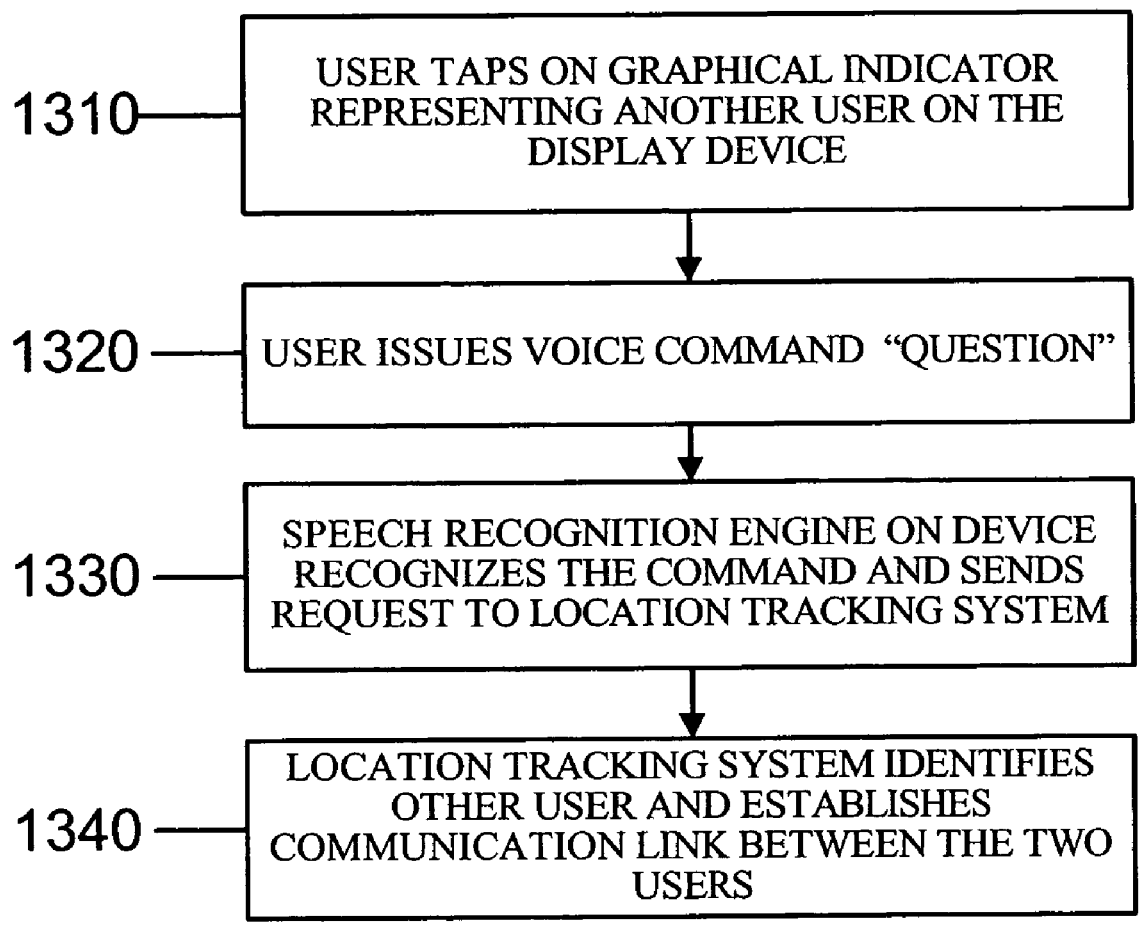
FIG. 13 is a flow chart illustrating a method for initiating an interactive help session with a remote tracked resource according to an embodiment of the present invention

In FIG. 11, the user draws a circle around, or taps the graphical indicator for interrogation (a XHTML+Voice document is used for displaying the graphical indicator) on the display interface (1110). The user then issues a voice command based on a pre-defined voice grammar on the display interface (1120). For example, the voice command may be "Where am I?" which results in occurrence of a pre-defined event for the issued voice command. The command is recognized by the pre-defined handler for the event and is converted into an HTTP request on the mobile device by the browser. The HTTP request is sent to the presentation system 230 (1130). An appropriate multimodal response is generated from a remote server in the location tracking system 140 (1140) and the audio output is rendered using TTS and the visual output is displayed on the mobile device display interface (1150).

Alternate Embodiments

Multimodal instructions

In another embodiment of the use of the mobile application framework, multimodal techniques are used to communicate instructions between users. For example, a user may tap a button on the touch-sensitive display of their mobile device; this may result in a TTS-generated voice command to one or more users.

Operation of multimodal instructions

The user can select a tracked resource/user by use of stylus to encircle graphical indicators of tracked resources plotted on a graphical map displayed on the multimodal interface to which it wants to communicate instructions (1210). The user also selects the instruction menu on the multimodal interface (1220). The user selects an instruction from the menu for the selected tracked resources (1230). The instruction chosen by the user is sent to and interpreted by the location tracking system 140 (1240). In response, an XHTML+Voice document is sent to the selected user(s) with the appropriate instruction by the location tracking system (1250). Each selected user gets an audio message (generated by TTS) with the appropriate instruction. Their screen also displays this instruction (1260).

Multimodal interrogation

In another embodiment of the use of the mobile multimodal system, the users can interrogate the location tracking system 140 using multimodal techniques. The interrogation by a tracked resource can be of two kinds (a) a voice command that can be recognized by a pre-defined voice grammar or (b) a pre-defined set of commands triggered by keypad/stylus gesture/taps on the touch-sensitive display of the mobile device. For example when a user has a question, they can use voice grammars defined in the active XHTML+Voice document such as "Question" whereby the location tracking system 140 connects the tracked resource to a second remote resource for an interactive question-answer session.

Operation of multimodal interrogation

In the embodiment of multimodal interrogation, the user draws a circle/taps the tracked resource for interrogation icon on the display interface (1310). Interrogation is performed using pre-defined voice grammars (1320) such as "Question." Embedded speech recognition on the device recognizes the command based on the pre-defined voice grammar, converts it into HTTP requests and sends the request to the location tracking system 140 (1330). The location tracking system 140 generates an appropriate response such that an audio link with the remote server that will facilitate an interactive question answer session is established (1340). An interactive voice dialog with the resource/server answering "Question" is created.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional information storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A system for dynamically mapping a site for presentation to a user, the system comprising:
   a. a computer network;
   b. a plurality of location sensors that are configured to transmit location signals over the network;
   c. a network module for receiving the location signals;
   d. a location tracking system comprising:
      i. a positioning engine for interpreting the location signals into location information and dynamically generating a graphical map of the site itself using the location information, wherein the site comprises a building and the graphical map of the site comprises a graphical map of the building, and dynamically generating the graphical map of the building to plot a location of tracked resources on the graphical map of the building; and
      ii. a presentation engine for displaying the graphical map to the user; and
   e. a user display.

2. The system of claim 1 wherein the system is configured to update the graphical map on an ongoing basis by receiving and interpreting additional location signals.

3. The system of claim 1 wherein one of the location sensors is associated with a tracked resource.

4. The system of claim 1 wherein the system further comprises a personal digital assistant, laptop computer or a mobile phone that includes a user display.

5. The system of claim 1 wherein the system is integrated with a multimodal system.

6. The system of claim 1 wherein at least some of the location sensors are extant location sensors associated with the site.

7. The system of claim 1 wherein at least some of the location sensors are RFID location sensors placed at the site at the time of mapping.

8. The system of claim 1 further comprising environmental sensors that transmit environmental signals.

9. The system of claim 8 wherein the environmental signals are interpreted as environmental information and presented in conjunction with the graphical map of the building.

10. The system of claim 1 further comprising one or more of the following: a mobile computing framework; a location tracking system; an archiving system; a map storage device; or an environmental tracking system.

11. The system of claim 1 wherein the location tracking system includes an indoor positioning engine and an outdoor positioning engine and a fusion engine that integrates the location information from the indoor positioning engine and the outdoor positioning engine to plot resources tracked by both the indoor positioning engine and the outdoor positioning engine.

12. A method of presenting localized environmental information superimposed on a map of a site, to a user, the method comprising:
   a. receiving location signals from a plurality of location sensors and environmental signals from a plurality of environmental sensors;
   b. interpreting the location signals as location information and the environmental signals as environmental information;
   c. dynamically generating a graphical map of the site itself using the location information, wherein the site comprises a building and the graphical map of the site comprises a graphical map of the building;
   d. applying the location information and the environmental information to the graphical map of the building as localized environmental information;
   e. displaying and archiving the graphical map with the applied information;
   f. repeating a through e on an ongoing basis so as to dynamically update the localized environmental information; and
   g. determining an occurrence of an event when the environmental information indicates that an environmental parameter falls outside of a predetermined range.

13. The method of claim 12 wherein the displaying is carried out on a personal digital assistant, laptop computer or a mobile phone that includes a user display.

14. The method of claim 12 wherein user inputs and outputs are from a multimodal system.

15. The method of claim 12 wherein at least some of the location or environmental sensors are extant sensors associated with the site.

16. The method of claim 12 wherein at least some of the location or environmental sensors are RFID sensors placed at the site at the time of mapping.

17. The method of claim 12 wherein the location signals are used to dynamically update the graphical map itself.

18. The method of claim 12 wherein an initial version of the graphical map is a generated using pre-existing, static data.

19. The method of claim 12 wherein at least some of the sensors are tagged to objects or building features at the site to identify the objects or features on the graphical map.

20. The method of claim 12 wherein one of the environmental parameter values is temperature.

21. The method of claim 12 wherein one of the environmental parameter values is chemical concentration.

22. The method of claim 12 wherein the location signals are used to calculate the distance between the location of one sensor and the location of every other tracked resource to identify all sensors and associated objects of interest within a pre-determined distance.

23. The method of claim 12 wherein a location tracking system is used to calculate the distance between one location sensor and other location sensors to identify all sensors and associated objects of interest within a pre-determined distance of the first location sensor.

24. The method of claim 12 wherein one of the location sensors is associated with a tracked resource.

25. The method of claim 12 further comprising:
   using an indoor positioning engine to track indoor resources and an outdoor positioning engine to track outdoor resources; and using a fusion engine that integrates the location information from the indoor positioning engine and the outdoor positioning engine to plot resources tracked by both the indoor positioning engine and the outdoor positioning engine.

26. A method of monitoring personnel movement and status at a site, wherein each personnel is associated with a tracked resource, the method comprising:
   a. receiving location signals from a plurality of location sensors, wherein at least one of the location sensors is associated with one or more tracked resource associated with a personnel;
   b. interpreting the location signals into location information;
   c. dynamically generating a graphical map of the site itself using the location information, wherein the site comprises a building and the graphical map of the site comprises a graphical map of the building;
   d. applying the location information to the graphical map of the building;
   e. displaying and archiving the graphical map superimposed with the one or more tracked resource;
   f. repeating a through e on an ongoing basis so as to continuously update the location of the tracked resource and the graphical map.

27. The method of claim 26 wherein at least some of the location sensors are extant location sensors associated with the site.

28. The method of claim 26 wherein at least some of the location sensors are RFID location sensors placed at the site at the time of mapping.

29. The method of claim 26 wherein the location signals are used to dynamically update the graphical map itself.

30. The method of claim 26 wherein an initial version of the graphical map is a generated using pre-existing, static data.

31. The method of claim 26 wherein at least some of the sensors are tagged to objects or building features at the site to identify the objects or features on the graphical map.

32. The method of claim 26 further comprising displaying environmental information superimposed on the graphical map using environmental signals received from environmental sensors.

33. The method of claim 26 further comprising accepting a user query for the user location, determining the user location, and communicating the user location to the user.

34. The method of claim 26 wherein the graphical map is displayed to a user on a mobile computer or PDA display.

35. The method of claim 26 wherein user inputs and outputs are from a multimodal system.

36. The method of claim 24 further comprising:
   using an indoor positioning engine to track indoor resources and an outdoor positioning engine to track outdoor resources; and
   using a fusion engine that integrates the location information from the indoor positioning engine and the outdoor positioning engine to plot resources tracked by both the indoor positioning engine and the outdoor positioning engine.

* * * * *